(12) United States Patent
Cestonaro et al.

(10) Patent No.: US 11,099,572 B2
(45) Date of Patent: Aug. 24, 2021

(54) SELF-MOVING DEVICE AND CONTROL METHOD THEREOF

(71) Applicant: Positec Power Tools (Suzhou) Co., Ltd., Jiangsu (CN)

(72) Inventors: Andrea Cestonaro, Vicenza (IT); Paolo Andriolo, Vicenza (IT); Don Zhendong Gao, Suzhou (CN); Shiping Jiao, Suzhou (CN); Jiang Du, Suzhou (CN); Yuanzhong Ran, Suzhou (CN); Xiurui Tang, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 204 days.

(21) Appl. No.: 16/195,204

(22) Filed: Nov. 19, 2018

(65) Prior Publication Data
US 2019/0171214 A1 Jun. 6, 2019

Related U.S. Application Data

(63) Continuation of application No. PCT/CN2017/085161, filed on May 19, 2017.

(30) Foreign Application Priority Data

May 19, 2016 (CN) .......................... 201610332842.6
May 19, 2016 (CN) .......................... 201610334287.0
(Continued)

(51) Int. Cl.
*G05D 1/02* (2020.01)
*A01D 34/00* (2006.01)
(Continued)

(52) U.S. Cl.
CPC ........... *G05D 1/0214* (2013.01); *A01D 34/00* (2013.01); *A01D 34/008* (2013.01); *B62D 25/16* (2013.01);
(Continued)

(58) Field of Classification Search
CPC ....... A01D 34/00; A01D 34/008; B62D 55/06
See application file for complete search history.

(56) References Cited

U.S. PATENT DOCUMENTS 9,241,442 B2 * 1/2016 Diazdelcastillo ...... A01D 42/00
2014/0121881 A1 5/2014 Diazdelcastillo
(Continued)

FOREIGN PATENT DOCUMENTS

CN 101091428 A 12/2007
CN 201107902 Y 9/2008
(Continued)

OTHER PUBLICATIONS

Machine Translation of Wei's reference (CN 201107902 Y) (Year: 2008).*
(Continued)

*Primary Examiner* — Thomas G Black
*Assistant Examiner* — Tarek Elarabi
(74) *Attorney, Agent, or Firm* — Middleton Reutlinger

(57) ABSTRACT

A self-moving device, including: a housing, provided with a motor; a moving module, including a track, the track, driven by the motor, moving the self-moving device; a working module; a control module, configured to control movement of the moving module and working of the working module; and a first sensor and a second sensor, configured to detect an obstacle in a moving direction of the self-moving device. The first sensor is configured to detect a first area in the moving direction, the second sensor is configured to detect a second area in the moving direction, and the first area and
(Continued)

the second area are arranged perpendicular to the moving direction. The control module controls a moving manner of the self-moving device according to sensing results of the first sensor and the second sensor.

18 Claims, 11 Drawing Sheets

(30) Foreign Application Priority Data

| | | |
|---|---|---|
| May 19, 2016 | (CN) | 201610334288.5 |
| May 19, 2016 | (CN) | 201610334439.7 |
| May 19, 2016 | (CN) | 201610334440.X |
| May 19, 2016 | (CN) | 201610334455.6 |
| May 19, 2016 | (CN) | 201610334786.X |
| Nov. 15, 2016 | (CN) | 201611005432.7 |

(51) Int. Cl.
| | |
|---|---|
| *B62D 25/16* | (2006.01) |
| *B62D 55/06* | (2006.01) |
| *G01C 3/08* | (2006.01) |
| *G01D 5/14* | (2006.01) |
| *G01D 5/20* | (2006.01) |
| *G01S 15/931* | (2020.01) |
| *A01D 69/02* | (2006.01) |
| *A01D 101/00* | (2006.01) |

(52) U.S. Cl.
CPC ............... *B62D 55/06* (2013.01); *G01C 3/08* (2013.01); *G01D 5/142* (2013.01); *G01D 5/20* (2013.01); *G01S 15/931* (2013.01); *G05D 1/0255* (2013.01); *G05D 1/0259* (2013.01); *A01D 69/02* (2013.01); *A01D 2101/00* (2013.01); *G05D 2201/0208* (2013.01)

(56) References Cited

U.S. PATENT DOCUMENTS

| | | | | |
|---|---|---|---|---|
| 2014/0324269 | A1* | 10/2014 | Abramson | G05D 1/0212 701/26 |
| 2018/0317368 | A1* | 11/2018 | Du | A01B 49/022 |
| 2019/0118877 | A1* | 4/2019 | Ran | B62D 55/242 |

FOREIGN PATENT DOCUMENTS

| | | |
|---|---|---|
| CN | 102662400 A | 9/2012 |
| CN | 103141210 A | 6/2013 |
| CN | 103733801 A | 4/2014 |
| CN | 203735069 | 7/2014 |
| CN | 205179745 U | 4/2016 |
| GB | 2230414 A | 10/1990 |

OTHER PUBLICATIONS

State Intellectual Property Office of the P.R. China, International Search Report and Written Opinion (English translation included) for PCT/CN2017/085161 dated Jul. 4, 2017, 10 pages.

* cited by examiner

SELF-MOVING DEVICE AND CONTROL METHOD THEREOF

TECHNICAL FIELD

The present invention relates to a self-moving device, and in particular, to a track-type robotic lawn-mower.

RELATED ART

With continuous advancement in computer technologies and artificial intelligent technologies, robotic lawn-mowers similar to robotic self-moving devices have already gradually entered people's lives. A robotic lawn-mower can autonomously mow and get charged in a user's lawn without intervention of a user. By using such an autonomous working system, no efforts are needed for management after the system is set once, and users are released from household works, such as cleaning and lawn maintenance, which are boring, time consuming, and labor intensive.

A conventional robotic lawn-mower usually uses a wheel-type travel mechanism. However, the wheel-type travel mechanism is poor in performance such as climbing and obstacle surmounting and cannot adapt to a complex terrain. With respect to the problems in the wheel-type travel mechanism, many manufacturers attempt to use a track-type travel mechanism. The track-type travel mechanism has a good climbing and obstacle surmounting performance and can adapt to a complex terrain. The change in the travel mechanism from the wheel type to the track type may certainly cause a change in the appearance and structure of the robotic lawn-mower, and therefore some problems in the structural design need to be overcome.

SUMMARY

To reduce travel resistance caused by friction between a grass surface and a machine body, a bottom part of a housing of the robotic lawn-mower is at a distance from the ground. Through such a distance, a human's foot or hand can stretch into the position below the housing and approach a strip blade or the like serving as a cutting element. To guarantee the personal safety of an operator, a top cover that completely covers the housing is designed in the wheel-type robotic lawn-mower to prevent a human's hand or foot from stretching into the position below the housing and coming into contact with the cutting element from the front or back side of the robotic lawn-mower. To achieve the foregoing objective, the top cover that completely covers the housing in the wheel-type robotic lawn-mower needs to be apart from the wheel-type travel mechanism and the housing for predetermined spatial distances. If the top cover in the wheel-type robotic lawn-mower is readily used in the track-type robotic lawn-mower, to achieve the purpose of guaranteeing the personal safety of the operator, the top cover still needs to be apart from a track travel mechanism and the housing for predetermined spatial distances. However, the design affects the climbing and obstacle surmounting performance of the track-type robotic lawn-mower. Therefore, the track-type robotic lawn-mower needs to use another structural design to prevent a human's foot or hand from stretching into the position below the housing and approaching the blade serving as the cutting element.

If the track can directly be in contact with an object in front of the robotic lawn-mower in a travel process of the robotic lawn-mower, the track may directly run over the object in front regardless of whether the object in front is an obstacle, a human's foot, a tree stump, or the like because the track-type robotic lawn-mower has a relatively good climbing performance. Therefore, the track-type robotic lawn-mower needs to be provided with a close-range obstacle detection structure, for detecting an obstacle within the close range to prevent the track from directly running over the object in front of the track-type robotic lawn-mower. In addition, the mass and the speed of a track lawn-mower are both greater than those of a common autonomous lawn-mower, and an impact generated thereby when colliding with an obstacle is much greater. More importantly, the track has a good obstacle surmounting capability and does not stop moving immediately when colliding with an obstacle (including a human body), and therefore the further movement of the track lawn-mower may, on one hand, cause run-over damage to the obstacle, and on the other hand, enable a cutting component (for example, a blade) to be directly in contact with the obstacle and cause a damage.

As known to a person skilled in the art, climbing performance of a vehicle is correlated to a height of a gravity center of a robotic lawn-mower, and a lower gravity center indicates better climbing performance of the vehicle. To improve the climbing performance of the track-type robotic lawn-mower, the structure of the track-type robotic lawn-mower needs to be designed to lower the gravity center thereof.

In the travel process of the track-type robotic lawn-mower, the track may generate a tension, the tension may generate a straining force on a bracket where a driving wheel and a guide wheel are connected to the housing, and therefore a strength break may be easily caused at the bracket where the wheel set is connected to the housing. The straining force may cause a deformation in the housing and a wheel shaft, and therefore the track may be easily disengaged from the driving wheel and the guide wheel.

In the travel process of the track-type robotic lawn-mower, the track wound between the guide wheel and the driving wheel may come into contact with a working surface. When there are only two force bearing points on the track (that is, a contact point between the guide wheel and the working surface and a contact point between the driving wheel and the working surface), the track may easily slip from the driving wheel and the guide wheel, that is, a disengagement phenomenon occurs. Moreover, there are only two force bearing points on the track, pressure on the two force bearing points is relatively large, and lawn abrasion by the robotic lawn-mower in the travel process is excessively large.

During travelling of the track-type robotic lawn-mower, mud or grass may be brought into an intermediate gap between a track shoe and a track wheel, and the track may be stuck between the track shoe and the track wheel after running for a period of time, resulting in increase of travelling resistance. When the travelling resistance increases to a degree of being difficult to travel, the vehicle needs to stop and cannot continuously run unless being flushed and cleaned by using a high-pressure water pump. In some cases, the vehicle cannot be started unless the track shoe is disassembled, cleaned, and then reinstalled. Especially for the track-type robotic lawn-mower, grass is continuously cut and may easily be accumulated between the track shoe and the track wheel. Not only travelling of the vehicle is affected, but also power is wasted, thereby affecting the working efficiency, or there may even be a risk that the track shoe is departed from the track wheel.

Therefore, the foregoing problems need to be resolved in the structural aspect if the track-type robotic lawn-mowers are intended to share the market with the wheel-type robotic lawn-mowers.

The embodiments of the present invention provide a self-moving device, the structural design of the self-moving device not only satisfies off-road performance such as climbing, but also has good safety performance, and problems such as grass crush in a running process are avoided.

A technical solution used in the embodiments of the present invention is: a self-moving device, including: a housing, provided with a motor; a moving module, including a track, the track, driven by the motor, moving the self-moving device; a working module, working in a moving state and/or non-moving state; a control module, configured to control movement of the moving module and working of the working module; and a first sensor and a second sensor, configured to detect an obstacle in a moving direction of the self-moving device, where the first sensor is configured to detect a first area in the moving direction, the second sensor is configured to detect a second area in the moving direction, and the first area and the second area are arranged perpendicular to the moving direction; and the control module controls a moving manner of the self-moving device according to sensing results of the first sensor and the second sensor.

In one of the embodiments, the first area and the second area are provided in a height direction of the self-moving device.

In one of the embodiments, the first area and the second area at least partially overlap each other.

In one of the embodiments, an upper boundary of the first area is not lower than 150 millimeters, and a lower boundary of the second area is not higher than 150 millimeters.

In one of the embodiments, after the first sensor and/or the second sensor detects the obstacle, the control module controls the self-moving device to avoid the obstacle.

In one of the embodiments, the first sensor is a non-contact sensor and the second sensor is a contact sensor.

In one of the embodiments, the self-moving device further includes a track resist member configured to protect the track and the second sensor is disposed on the track resist member.

In one of the embodiments, the numbers of the track resist members is four, respectively corresponding to upper front sides of two end portions of each of the tracks located on two sides of the housing.

In one of the embodiments, a height distance from a lowermost end of the track resist member to a working surface in a vertical direction is in a range of 40 millimeters to 70 millimeters.

In one of the embodiments, a lowermost end of the track resist member in a vertical direction is lower than half of a height of a end of the track in the vertical direction.

In one of the embodiments, a shortest distance from the track resist member to the track under the track resist member is less than or equal to 50 millimeters.

In one of the embodiments, a transverse width of the track resist member is greater than a transverse width of the track.

In one of the embodiments, a distance from an outer edge of the track resist member to an outer edge of the track is greater than or equal to 5 millimeters.

In one of the embodiments, after the control module determines that there is an obstacle at an upper front side of the track resist member, the control module controls the self-moving device to make a turn or retreat.

In one of the embodiments, the contact sensor includes a Hall sensor, a magnetic signal induction sensor, or a micro switch.

In one of the embodiments, the track resist member is a cover plate of a predetermined shape.

In one of the embodiments, the track resist member is a stop lever.

In one of the embodiments, the stop lever includes a shape having a height and a width formed by winding a steel wire member in a predetermined manner.

In one of the embodiments, the self-moving device includes a top cover movably connected to the housing and the track resist member is disposed on an end angle of the top cover.

In one of the embodiments, the contact sensor detects a displacement of the top cover relative to the housing.

In one of the embodiments, a maximum value of a momentum of the self-moving device during movement is greater than 5 kg·m/s.

In one of the embodiments, a mass of the self-moving device is greater than 12 kg.

In one of the embodiments, a maximum value of a moving speed of the self-moving device is greater than 0.45 m/s.

In one of the embodiments, at least a part of the track that is below a rotation center of revolving motion of the track is exposed at a front end of the self-moving device in the moving direction.

In one of the embodiments, the housing includes an upper cover, the upper cover partially covering the track; and at a front end of the self-moving device in the moving direction, a distance between a lower edge of the upper cover and a working plane is greater than a distance between the rotation center of the revolving motion of the track and the working plane.

In one of the embodiments, by using a direction that is parallel to a working plane of the self-moving device and perpendicular to the moving direction of the self-moving device as a width direction, an effective detection width of the non-contact sensor covers a width range of the track.

In one of the embodiments, the effective detection width of the non-contact sensor is greater than a width of the self-moving device.

In one of the embodiments, after a distance between the self-moving device and the obstacle detected by the non-contact sensor is less than or equal to a predetermined first distance, the control module controls the self-moving device to stop moving.

In one of the embodiments, after the distance between the self-moving device and the obstacle detected by the non-contact sensor is less than or equal to the first distance, the control module controls the self-moving device to stop moving after a time delay of T.

In one of the embodiments, the non-contact sensor is an ultrasonic sensor, and if there is an obstacle within a second distance in front of the self-moving device, the ultrasonic sensor does not detect the obstacle, the first distance is less than or equal to the second distance.

In one of the embodiments, if the non-contact sensor detects an obstacle in front of the self-moving device, the control module optionally controls the self-moving device to decelerate, make a turn, or retreat.

In one of the embodiments, at least one of the non-contact sensors is disposed on a front side of the self-moving device in the moving direction.

In one of the embodiments, the non-contact sensor is an ultrasonic sensor or an optical sensor.

A technical solution provided in the embodiments of the present invention is: a control method for a self-moving device, the self-moving device including a moving module, the moving module including a track, and the track being driven by a motor to drive the self-moving device to move, where the control method for the self-moving device includes the steps of: detecting, by a first sensor and a second sensor, whether there is an obstacle in a moving direction of the self-moving device; and if an obstacle is detected in the moving direction of the self-moving device, adjusting a moving manner of the self-moving device, where a detection area of the second sensor covers a detection blind area of the first sensor.

In one of the embodiments, a maximum value of a momentum of the self-moving device during movement is controlled to be greater than 5 kg·m/s.

In one of the embodiments, a maximum value of a moving speed of the self-moving device is controlled to be greater than 0.45 m/s.

In one of the embodiments, after a distance to the obstacle detected by the first sensor and the second sensor is less than or equal to a predetermined first distance, the self-moving device is controlled to stop moving.

In one of the embodiments, after a distance to the obstacle detected by the first sensor and the second sensor is less than or equal to the first distance, the self-moving device is controlled to stop moving after a time delay of T.

In one of the embodiments, the first sensor is an ultrasonic sensor, and if there is an obstacle within a second distance in front of the self-moving device, the ultrasonic sensor does not detect the obstacle, the first distance is less than or equal to the second distance.

In one of the embodiments, if the first or second sensor detects an obstacle in front of the self-moving device, the self-moving device is optionally controlled to decelerate, make a turn, or retreat.

In the embodiments of the present invention, a track resist member is disposed on an upper front side at an end portion of the track, when there is an obstacle in front of the track, the track resist member first collides with the obstacle, a collision detection sensor detects the collision and transmits collision information to the control module, and the control module controls the robotic lawn-mower to make a turn or retreat. In this technical solution, an obstacle within a close range of the robotic lawn-mower is effectively sensed, thereby preventing the track from directly running over an object in front and effectively improving the safety performance of the robotic lawn-mower.

To resolve the problems in the prior art, a technical solution used in the embodiments of the present invention is: a self-moving device, in particular, a robotic lawn-mower, including: a housing; a working module, located at a bottom part of the housing and configured to perform a cutting work; and travel modules, located on two sides of the housing, the travel module on each side including a track, where the bottom part of the housing is provided with a protecting member, the protecting member is located in front of and/or behind the working module and is configured to shield the working module, and an extension range of the protecting member covers at least most length of a portion between the tracks on the two sides.

In one of the embodiments, the protecting member has a predetermined height in the vertical direction.

In one of the embodiments, a distance from a free end of the protecting member to a working surface in the vertical direction is in a range of 40 millimeters to 70 millimeters.

In one of the embodiments, a shortest distance from a side of the protecting member to the track on the corresponding side is less than or equal to 20 millimeters.

In one of the embodiments, the entire protecting member presents a comb shape, including a plurality of comb teeth.

In one of the embodiments, an interval width between adjacent comb teeth is less than or equal to 20 millimeters.

In one of the embodiments, the protecting member is located at a front and/or rear end of the bottom part of the housing.

In one of the embodiments, a shortest distance from the protecting member to the working module is greater than or equal to 10 millimeters.

In one of the embodiments, the entire protecting member presents a plate shape.

In one of the embodiments, A guide member includes a guide wheel or a guide support part.

In one of the embodiments, A driving member includes a driving wheel.

In one of the embodiments, the housing includes a chassis, and the protecting member is disposed on a bottom part of the chassis.

In one of the embodiments, the robotic lawn-mower further includes a top cover movably connected to the housing, the top cover includes a main body configured to cover the housing, and a distance from a lowest point of the main body to the working surface in the vertical direction is greater than 70 millimeters.

In the embodiments of the present invention, the protecting member is disposed at the bottom part of the housing and is located in front of and/or behind the working module, to construct a protecting barrier, so as to effectively prevent a human's hand or foot from coming into contact with the working module from the front or back side of the housing, thereby effectively improving the safety performance of the robotic lawn-mower.

A technical solution used in the embodiments of the present invention is: a self-moving device, in particular, a robotic lawn-mower, including a housing, the housing being hollowed to form a receiving cavity; a control module, located in the receiving cavity, and configured to control the robotic lawn-mower to work and travel autonomously; and travel modules, located on two sides of the housing, the travel module on each side including a front support member, a rear support member, and a track, the track being wound around the front support member and the rear support member, where the robotic lawn-mower further includes a frame module connected to the housing and the frame module fixes and supports the travel module.

In one of the embodiments, the frame module includes a mounting portion and a support, where the mounting portion is configured to mount the front support member and the rear support member and the support forms a profile of the frame module.

In one of the embodiments, the front support member includes a front wheel and the rear support member includes a rear wheel.

In one of the embodiments, the mounting portion includes a first central shaft and a second central shaft, the front wheel is mounted on the first central shaft, and the rear wheel is mounted on the second central shaft.

In one of the embodiments, the first central shaft is apart from the second central shaft for a predetermined distance in a longitudinal direction.

In one of the embodiments, the distance from the first central shaft to the second central shaft in the longitudinal direction is in a range of 200 millimeters to 800 millimeters.

In one of the embodiments, the support includes a first fixing plate configured to connect to the housing.

In one of the embodiments, the support includes a second fixing plate configured to shield fitting portions between the track and the front support member and between the track and the rear support member.

In one of the embodiments, the support includes a second fixing plate configured to shield an outer profile of the track.

In one of the embodiments, the frame module supports two transverse ends of the front support member and/or the rear support member.

In the embodiments of the present invention, the frame module is used to fix and support the travel modules and the travel modules are connected to the housing through the frame module, thereby resolving the problem of deformation of the housing and disengagement of the track caused by the straining force of the track and effectively improving the working performance of the track-type robotic lawn-mower.

A technical solution used in the embodiments of the present invention is: a self-moving device, in particular, a robotic lawn-mower, including a housing, the housing being hollowed to form a receiving cavity; a control module, located in the receiving cavity, and configured to control the robotic lawn-mower to work and travel autonomously; travel modules, located on two sides of the housing, the travel module on each side including a track, where the robotic lawn-mower further includes a lower support member, configured to support a contact surface between the track and a working surface.

In one of the embodiments, a type of friction between the lower support member and an inner surface of the track is rolling friction.

In one of the embodiments, the lower support member includes a wheel-type structure.

In one of the embodiments, there is a plurality of the wheel-type structures.

In one of the embodiments, the plurality of wheel-type structures is arranged at equal pitches.

In one of the embodiments, the wheel-type structure includes a wheel shaft and a support roller and the support roller is mounted on the wheel shaft.

In the embodiments of the present invention, the lower support member is disposed, to support a contact surface between the track and the working surface, and force bearing points between the track and working surface are increased, thereby effectively dispersing pressure on a lawn by the track during a travelling process and avoiding the problem of grass crush of the track-type robotic lawn-mower.

A technical solution used in the embodiments of present invention is: a self-moving device, in particular, a robotic lawn-mower, including a housing; a working module, located at a bottom part of the housing and configured to perform a cutting work; travel modules, located on two sides of the housing, the travel module on each side including a first wheel, a second wheel, and a track, and the track being wound by using the first wheel and the second wheel as two ends, where an outer diameter of the first wheel is less than an outer diameter of the second wheel, the first wheel is a driving wheel, and the second wheel is a guide wheel.

In one of the embodiments, a ratio of the outer diameter of the first wheel to the outer diameter of the second wheel is in a range of 1:1.5 to 1:5.

In one of the embodiments, an outer diameter of the driving wheel is in a range of 50 millimeters to 180 millimeters.

In one of the embodiments, an outer diameter of the guide wheel is in a range of 100 millimeters to 400 millimeters.

In one of the embodiments, a longitudinal distance from a wheel shaft of the driving wheel to a wheel shaft of the guide wheel is in a range of 200 millimeters to 800 millimeters.

In one of the embodiments, the robotic lawn-mower further includes an electric motor for driving the driving wheel, and a distance from a gravity center of the electric motor to a working surface is in a range of 25 millimeters to 90 millimeters.

In one of the embodiments, the robotic lawn-mower further includes an energy module and the energy module is disposed at the other end away from the electric motor.

In the embodiments of the present invention, the outer diameters of a front support member and a rear support member are set to be different, so that heights of two end portions of the track are different, thereby making a good balance between reduction of a height of a gravity center of the robotic lawn-mower and maintenance of an obstacle surmounting capability and effectively improving working performance of the entire robotic lawn-mower.

A technical solution used in the embodiments of the present invention is: a self-moving device, in particular, a robotic lawn-mower, including a housing, the housing being hollowed to form a receiving cavity; a working module, located at a bottom part of the housing and configured to perform a cutting work; travel modules, located on two sides of the housing, the travel module on each side including a first wheel, a second wheel, and a track, the track being wound by using the first wheel and the second wheel as two ends; an energy module, located in the receiving cavity; and an electric motor module, located in the receiving cavity and including a working electric motor for driving the working module to work and a driving electric motor for driving a driving wheel, where in a vertical direction, a gravity center of the overall unit of the robotic lawn-mower is not higher than a wheel center of the first wheel and a wheel center of the second wheel.

In one of the embodiments, in the vertical direction, the gravity center of the overall unit of the robotic lawn-mower is located between the wheel center of the first wheel and the wheel center of the second wheel.

In one of the embodiments, a distance from the gravity center of the overall unit of the robotic lawn-mower to a working surface is in a range of 25 millimeters to 160 millimeters.

In one of the embodiments, a height of the first wheel is less than a height of the second wheel.

In one of the embodiments, a ratio of the height of the first wheel to the height of the second wheel is in a range of 1:1.5 to 1:5.

In one of the embodiments, the height of the first wheel is in a range of 50 millimeters to 180 millimeters.

In one of the embodiments, the height of the second wheel is in a range of 100 millimeters to 400 millimeters.

In one of the embodiments, a distance from a gravity center of the driving electric motor to a working surface is in a range of 25 millimeters to 90 millimeters.

In one of the embodiments, the energy module is disposed at the other end away from the driving electric motor.

In one of the embodiments, the first wheel is a driving wheel and the second wheel is a guide wheel.

In one of the embodiments, a longitudinal distance from a wheel shaft of the driving wheel to a wheel shaft of the guide wheel is in a range of 200 millimeters to 800 millimeters.

A height of the gravity center of the overall unit of the robotic lawn-mower defined in the embodiments of the present invention is in a range of 25 millimeters to 160 millimeters. Specifically, this is implemented by means of different heights of two ends of the track and arrangement of large-mass components in the receiving cavity, thereby effectively improving the climbing performance of the robotic lawn-mower.

The embodiments of the present invention provide a track wheel, including two flanges and a connection portion that connects the two flanges and that is located between the two flanges, where the flange includes a first side and a second side opposite to each other, the first sides of the two flanges are disposed close and opposite to each other, an engagement slot is disposed between the two flanges, and at least one of the flanges is provided with a through hole communicated to the engagement slot and the second sides.

By using the track wheel, when mud or grass enters an engagement portion between the track and the track wheel, the mud or grass may enter the engagement slot and be discharged, via the through hole, to the second sides of the flanges, thereby preventing the track wheel from carrying mud or grass and ensuring continuous and normal operation of the track wheel.

In an embodiment, the two flanges are both provided with the through holes.

In an embodiment, the flange includes a bottom plate and a rim disposed at an edge of the bottom plate and the through hole is provided on the bottom plate.

In an embodiment, the bottom plate of the flange is provided with a reinforcing frame, the reinforcing frame includes a hollow cavity, and the through hole is communicated to the hollow cavity.

In an embodiment, the reinforcing frame is in a stair-like shape and includes a root closer to a center of the bottom plate and a top part away from the center of the bottom plate and connected to the rim.

In an embodiment, the track wheel further includes a hub disposed at the center of the flange and the center of the hub is provided with a connecting hole.

A track travel mechanism includes a track and a track wheel, the track wheel includes a driving wheel and a guide wheel, and the track covers the driving wheel and the guide wheel.

A track travel mechanism includes a track and a track wheel, the track wheel includes two flanges connected to each other, the track covers the track wheel, and at least one of the flanges of the track wheel is provided with a discharge channel communicated to an engagement portion between the track and the flange and connected to an outside of the track wheel.

A track-type robotic lawn-mower includes the track travel mechanism and a working component mounted on the machine body of the track travel mechanism and configured to cut grass, and the working component is mounted on the machine body.

By using the track wheel and track-type travel mechanism, when mud or grass enters an engagement portion between the track and the track wheel, the mud or grass may enter the engagement slot and be discharged, via the through hole, to the second sides of the flanges, thereby preventing the track wheel from carrying mud or grass and ensuring continuous and normal operation of the track wheel. The embodiments of the present invention further disclose a track travel mechanism including the track wheel and a track-type robotic lawn-mower.

| | | |
|---|---|---|
| 100. Robotic lawn-mower | 10. Housing | 12. Upper cover |
| 14. Chassis | 102. Electric motor | 104. Control module |
| 106. Energy module | 108. Working module | 1081. Rotating disk |
| 1083. Cutting element | 20. Travel module | 201. Rear support member |
| 202. First wheel | 203. Front support member | 204. Second wheel |
| 210. Track | 211. First section | 213. Second section |
| 215. Upper section | 217. Lower section | 30. Protecting member |
| 31. Left side | 32. Right side | 40. Frame module |
| 401. First fixing plate | 403. Second fixing plate | 405. First central shaft |
| 407. Second central shaft | 410. Lower support member | 411. Support shaft |
| 413. Support roller | 50. Top cover | 52. Track resist member |
| 105. Gear box | | |

DETAILED DESCRIPTION

The detailed description and technical content related to the present invention are described below with reference to the accompanying drawings. However, the accompanying drawings appended only provide reference and description, but are not intended to limit the present invention.

Figure 1:
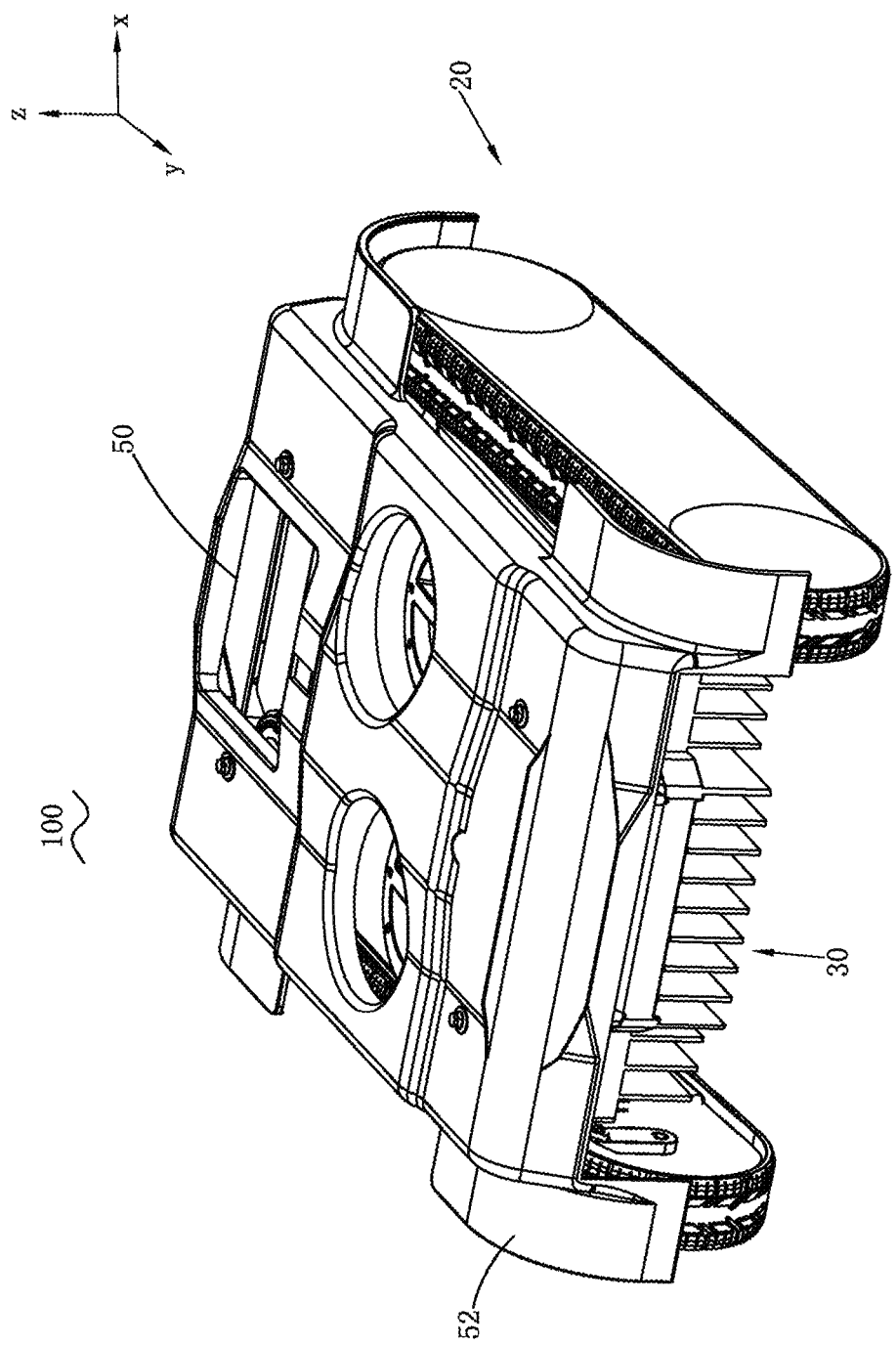
FIG. 1 is a schematic three-dimensional diagram of a track-type robotic lawn-mower according to an embodiment of the present invention.
Figure 2:
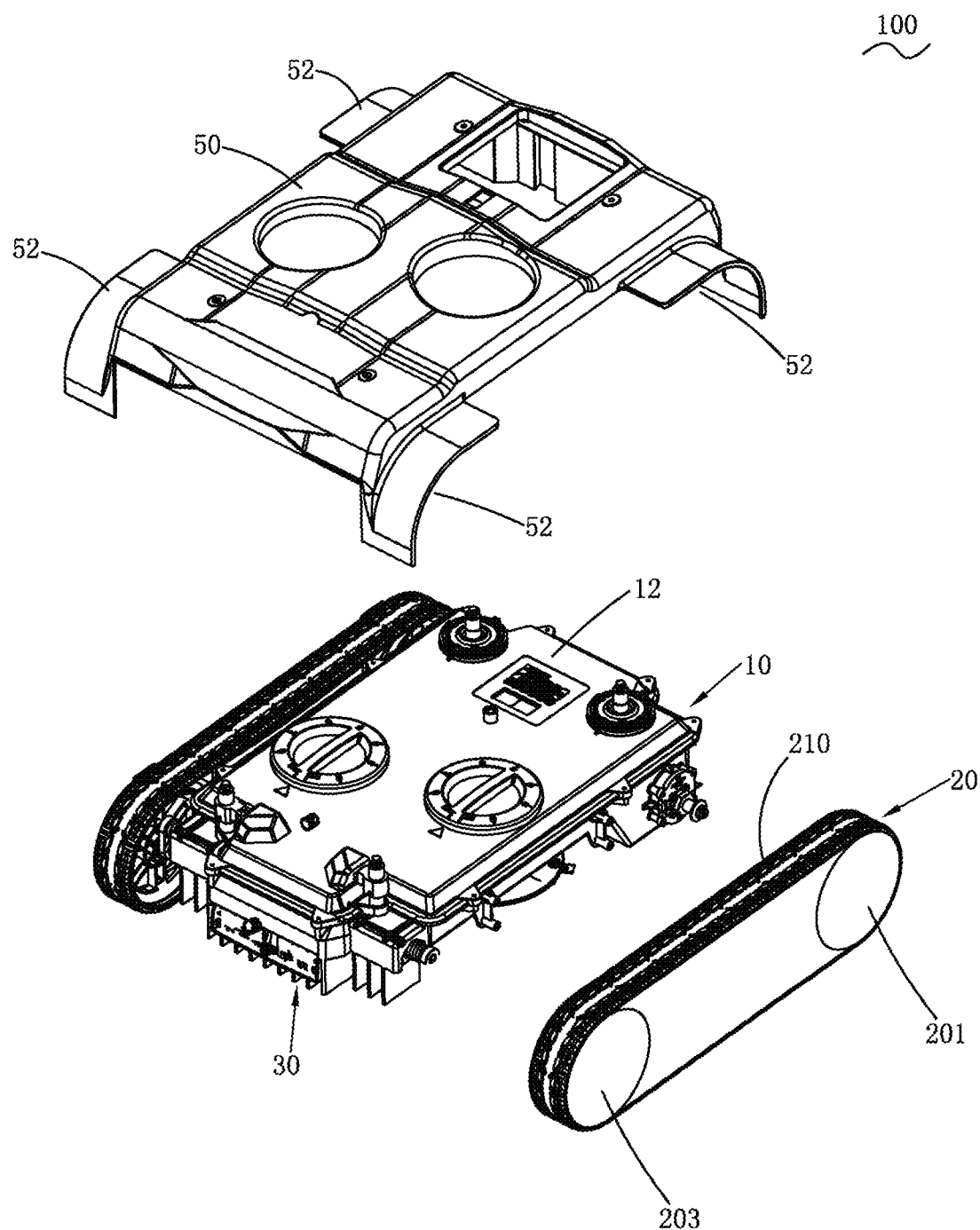
FIG. 2 is a schematic exploded view of a part of the track-type robotic lawn-mower shown in FIG. 1.

As shown in FIG. 1 and FIG. 2, the embodiments of the present invention provide a self-moving device. The self-moving device may be specifically a device capable of moving autonomously such as a robotic lawn-mower, an autonomous snow sweeper, or a robotic sweeper. This embodiment provides a robotic lawn-mower 100. The robotic lawn-mower 100 includes a housing 10, travel modules 20 located on two sides of the housing 10, a working module 108 located at a bottom part of the housing 10, an electric motor 102 located in the housing 10, a control module 104 configured to control the robotic lawn-mower 100 to work and travel autonomously, and an energy module 106 configured to provide energies.

In the descriptions of the embodiments of the present invention, a Cartesian coordinate system is set up by an orientation where the robotic lawn-mower 100 shown in FIG. 1 is located. A direction of a y axis is defined as a longitudinal direction of the robotic lawn-mower 100, a direction toward a positive side of the y axis is defined as a front side of the robotic lawn-mower 100, and a direction toward a negative side of the y axis is defined as a back side of the robotic lawn-mower 100. A direction of an x axis is defined as a transverse direction of the robotic lawn-mower 100, a direction toward a positive side of the x axis is defined as a right side of the robotic lawn-mower 100, and a direction toward a negative side of the x axis is defined as a left side of the robotic lawn-mower 100. A direction of a z axis is defined as a vertical direction of the robotic lawn-mower 100, a direction toward a positive side of the z axis is defined as an upper side of the robotic lawn-mower 100, and a direction toward a negative side of the z axis is defined as a lower side of the robotic lawn-mower 100.

In this embodiment, the housing 10 includes an upper cover 12 and a chassis 14. The upper cover 12 and the chassis 14 construct a hollow receiving cavity. Components such as an electric motor 102, a control module 104, and an energy module 106 are mounted in the receiving cavity, and together support implementation of various functions of the robotic lawn-mower 100. Certainly, a plurality of sensors may further be disposed on the housing 10 or in the housing 10, to assist the robotic lawn-mower 100 to implement the various functions.

Two sides of the housing 10 are each provided with a travel module 20, symmetrical to each other relative to the housing 10. The travel module 20 includes a front support member 203, a rear support member 201, and a track 210. The track 210 is wound around the front support member 203 and the rear support member 201 by using the front support member 203 and the rear support member 201 as two ends. The track 210 connects the rear support member 201 and the front support member 203, and is a part, of the entire robotic lawn-mower 100, that is in contact with ground. In this embodiment, the front support member 203 is specifically a driving wheel and the rear support member 201 is specifically a guide wheel. The front support member 203 is driven by the electric motor 102 to rotate, to further drive the track 210 to move forward by revolving around the rear support member 201 and the front support member 203, so as to drive the robotic lawn-mower 100 to move forward. Certainly, the rear support member 201 may alternatively be in another form other than that shown in the embodiment of FIG. 1, such as a guide support part or a wheel set, provided that the rear support member 201 can support a end of the track 210.

Figure 3:
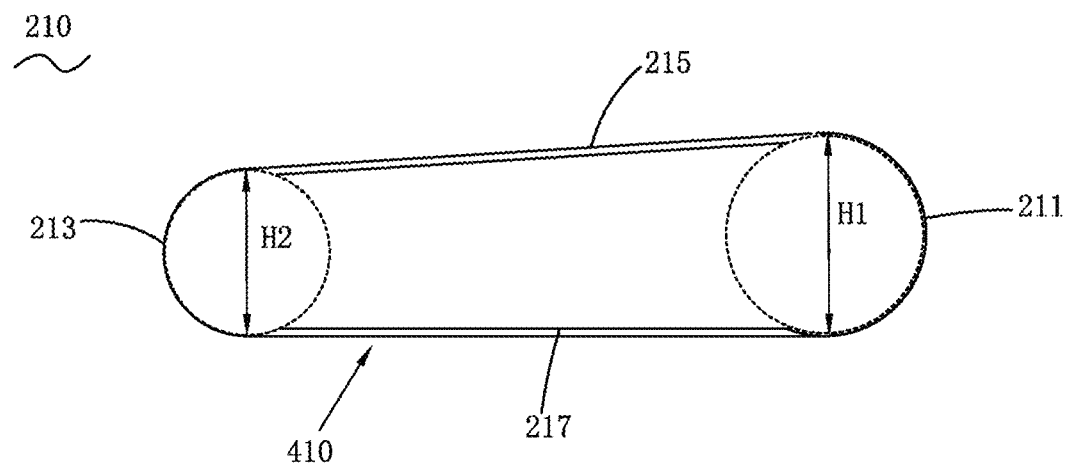
FIG. 3 is a schematic side view of a travel module according to the embodiment shown in FIG. 1.

As shown in FIG. 3, the track 210 may be spatially divided into four sections. In this embodiment, a portion where the track 210 is engaged with the rear support member 201 is defined as a first section 211; a portion where the track 210 is engaged with the front support member 203 is defined as a second section 213; a portion above a portion between the first section 211 and the second section 213 is defined as an upper section 215; and a portion below the portion between the first section 211 and the second section 213 is defined as a lower section 217. Certainly, the first section 211 may alternatively be defined as the portion where the track 210 is engaged with the front support member 203, and the second section 213 may be defined as the portion where the track 210 is engaged with the rear support member 201.

In the embodiments of the present invention, the rear support member 201 is a guide wheel as an embodiment and the front support member 203 is a driving wheel as an embodiment. Correspondingly, the first section 211 is an arc-shaped portion where the track 210 is engaged with the guide wheel and the second section 213 is an arc-shaped portion where the track 210 is engaged with the driving wheel.

In this embodiment, the driving wheel is located at a front side of the robotic lawn-mower in the longitudinal direction and serves as a front wheel; and the guide wheel is located at a back side of the robotic lawn-mower in the longitudinal direction and serves as a rear wheel. Certainly, the position relationship between the driving wheel and the guide wheel in the longitudinal direction is not limited. That is, the guide wheel may serve as the front wheel and is located at the front side of the robotic lawn-mower in the longitudinal direction.

In the existing structural design, the travel module 20 is connected to the housing 10 through wheel shafts of the driving wheel and the guide wheel. In a travel process of the travel module 20, the track 210 may generate a first straining force F1 in a direction opposite to a forward direction for the driving wheel and may generate a second straining force F2 in a direction the same as the forward direction for the guide wheel. The first straining force F1 may act on the wheel shaft of the driving wheel and the second straining force F2 may act on the wheel shaft of the guide wheel. The straining forces act on the wheel shafts to form a torsion, resulting in deformation in the housing 10 and the wheel shafts. Therefore, a connection portion between the housing and the wheel shafts is easy to break and the deformation of the wheel shafts may cause disengagement of the track.

To avoid occurrence of the foregoing problem, in the embodiments of the present invention, a frame module 40 is used to support and fix the travel modules 20. The travel modules 20 are supported and fixed by the frame module 40 and are connected to the housing 10 through the frame module 40. The frame module 40 includes a support and a mounting portion. The support is a main body of the frame module 40 and is configured to fix a wheel-set mounting portion, connect to the housing 10, and form a profile of the frame module 40. The specific form of the mounting portion varies along with different structural forms of the front support member and the rear support member. In this embodiment, the front support member and the rear support member are both in a wheel set form, and therefore the specific form of the mounting portion is a wheel-set mounting portion. The wheel-set mounting portion is configured to mount the driving wheel and the guide wheel. The track 210 is wound around the driving wheel and the guide wheel. The travel modules 20 and the frame module 40 form an entire module and may be modularizedly connected to the housing 10. The travel modules 20 are supported and fixed by the frame module 40 and are connected to the housing through the frame module 40. Specifically, the frame module 40 is connected to the housing 10 in mechanical connection manners, such as thread connection, rivet connection, or welding. The frame module 40 supports two transverse ends of the front support member and/or the rear support member. That is, two ends of the wheel shaft of the guide wheel and two ends of the wheel shaft of the driving wheel are all supported by the frame module 40. Due to the support function of the frame module 40, the straining force generated by the track 210 no longer constructs a bracket with the wheel shafts to generate a torsion, thereby preventing the housing 10 from deforming and avoiding occurrence of a disengagement phenomenon in the track 210.

Figure 4:
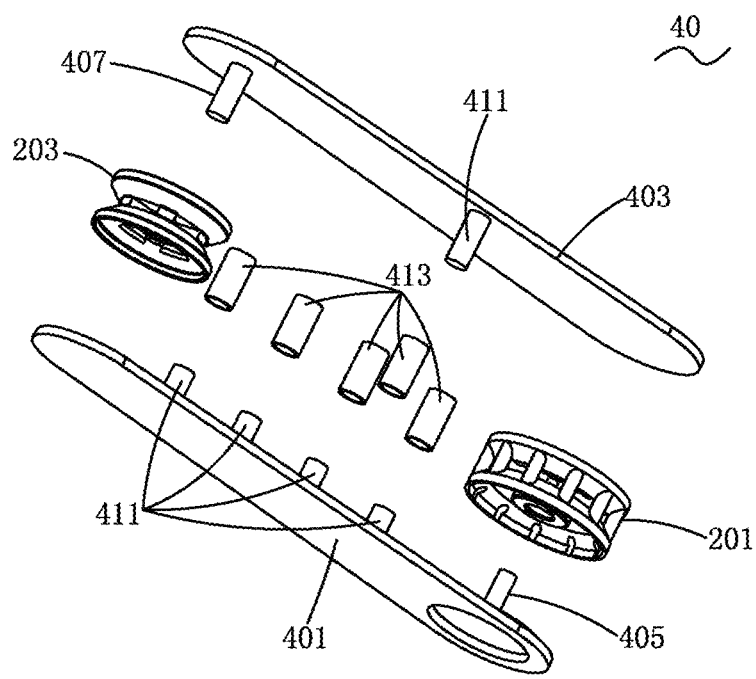
FIG. 4 is a schematic exploded view of a frame module according to an embodiment of the present invention.

In this embodiment, a specific embodiment of the frame module 40 is shown in FIG. 4. The frame module 40 includes a mounting portion and a support. The support includes a first fixing plate 401 and a second fixing plate 403 that are arranged at an interval and opposite to each other. In one of the embodiments, the first fixing plate 401 and the second fixing plate 403 are parallel to each other. The wheel-set mounting portion includes a first central shaft 405 and a second central shaft 407. The first central shaft 405 and the second central shaft 407 are both disposed between the first fixing plate 401 and the second fixing plate 403 and are spaced away from each other for a predetermined distance in the longitudinal direction of the housing 10. The guide wheel is mounted on the first central shaft 405. When the robotic lawn-mower 100 travels, the guide wheel rotates around the first central shaft 405. The driving wheel is mounted on the second central shaft 407. When the robotic lawn-mower 100 travels, the driving wheel rotates around the second central shaft 407. A distance from the first central shaft 405 to the second central shaft 407 is in a range of 200 millimeters to 800 millimeters.

The travel modules 20 are connected to the housing 10 through the frame module 40. Therefore, modularized assembly of the robotic lawn-mower 100 can be implemented. That is, the travel module 20 and the frame module 40 are mounted to the housing 10 as a whole.

During assembly, a user first assembles the driving wheel and the guide wheel to the second central shaft 407 and the first central shaft 405 respectively, then engages the first fixing plate 401 with the second fixing plate 403 to form a whole body, and connects the first fixing plate 401 to a side of the housing 10 by means of, for example, screw rivet and clamping.

In this embodiment, due to the support and limit function of the first fixing plate 401 and the second fixing plate 403, the straining force of the track may not generate a torsion for the first central shaft and the second central shaft. Therefore, by using the technical solution in which the travel modules 20 are engaged with the housing through the frame module 40, the track is not easy to disengage, and an engagement portion between the housing 10 and the first fixing plate 401 is not easy to break.

In the existing structural design, there are only two positions where the driving wheel and the guide wheel are in contact with the ground serving as force bearing points between the track 210 and the ground/working surface. Therefore, pressure at the two positions is quite large and run-over damage is easy to be caused to the lawn. Likewise, because there are only two positions between the track 210 and the ground/working surface for bearing force, uneven force bearing is easy to occur at portions where the rest part of the track 210 is in contact with the ground/working surface, to generate a slip or disengagement phenomenon.

To avoid occurrence of the foregoing problem, in one of the embodiments, the robotic lawn-mower 100 further includes a lower support member 410. The lower support member 410 is configured to support the portion where the track is in contact with the ground/working surface, and increase a number of force bearing points between the track 210 and the ground/working surface to disperse the pressure on the ground/working surface by the track 210. A specific structural form of the lower support part 410 may be a support block disposed along a lower section 217 of the track. In one of the embodiments, to reduce the friction between the track 210 and the lower support member 410, the lower support member 410 may be of a wheel-type structure, a floating-type structure, a spheroid structure, or the like.

As shown in FIG. 4, in this embodiment, the lower support member 410 is disposed between the first central shaft 405 and the second central shaft 407 of the frame module 40. The lower support member 410 includes a plurality of support shafts 411 disposed between the first fixing plate 401 and the second fixing plate 403 and support rollers 413 capable of rotating around the support shafts 411. The support rollers 413 are engaged with and in contact with an inner surface of the lower section 217 of the track. Certainly, the lower support member 410 may alternatively be provided with a structure for supporting the upper section 215. Certainly, the lower support member 410 may alternatively use other structures provided that the engagement portion between the lower support member 410 and the track 210 presents rolling friction, and the specific form of the lower support member 410 may be a roller, a roll ball, a spheroid, an arc shape, or the like.

Force bearing points between the lower section 217 and the working surface/ground in the lower support member 410 are increased, so that the track 210 is not easy to slip from the portion between the driving wheel and the guide wheel, that is, the disengagement phenomenon is not easy to occur. The force bearing points of the track 210 are increased, and the pressure on the working surface/ground by the whole lower section 217 may be dispersed to the respective force bearing points, so that pressure on each force bearing point is small, and lawn abrasion by the robotic lawn-mower in the travel process is not excessively large.

To prevent a human's hand or foot from coming into contact with the working module 108 from a side of the housing 10, to trigger an accidental cut by an cutting element, and to prevent a human's hand or foot from being accidentally stuck into an engagement portion between the track and the wheel, to trigger an accidental involvement of a human's hand or foot into the track, in one of the embodiments, a protecting device is disposed at a side of the frame module 40 of the embodiments of the present invention away from the outside of the housing 10. The protecting device may be specifically a closed protecting plate. Certainly, the protecting device may alternatively be an independent component not belonging to the frame module 40, provided that the protecting device is engaged at the side of the frame module 40 away from the outside of the housing 10.

As shown in FIG. 4, in this embodiment, the second fixing plate 403 away from the outside of the housing 10 in the frame module 40 is a fully closed plate and is configured to shield a hollow portion in an inner ring of the track 210. The second fixing plate 403 shields the working module 108 at the bottom part 14 of the housing from a side, to prevent a human's hand or foot from coming into contact with the working module 108 from the side of the housing 10. The second fixing plate 403 shields the portion where the track is engaged with the wheel set, to prevent a human's hand or foot from being involved into the running process of the track. Certainly, the second fixing plate 403 may alternatively be a specific shape of other types, provided that the second fixing plate 403 can prevent a human's hand or foot from directly coming into contact with the working module 108 and the engagement portion between the track and the wheel set.

The robotic lawn-mower 100 is a machine that work and travel autonomously and needs to adapt to various types of lawn terrains. Changed from the wheel-type travel mechanism into the track-type travel mechanism, the terrain adaptability of the robotic lawn-mower 100 has been improved significantly. The terrain adaptability of the track-type robotic lawn-mower can still be further improved by means of structural configuration. A lower gravity center of the robotic lawn-mower indicates better performance in aspects of climbing, turning, or the like. A smaller radius of the wheel set of the robotic lawn-mower indicates a lower height of the entire machine body, and further indicates a lower gravity center of the robotic lawn-mower. Meanwhile, the robotic lawn-mower requires for an obstacle surmounting capability, to cross over obstacles such as recessed and raised portions of a lawn. A larger radius of the wheel set of the robotic lawn-mower indicates a larger maximum size of an obstacle that the robotic lawn-mower can cross over, that is, indicates a better obstacle surmounting capability.

To consider both the climbing and obstacle surmounting performance, for the track that is of the track-type robotic lawn-mower and that is wound by using the front support member and the rear support member as two ends, a height of the front support member is different from that of the rear support member, and therefore, heights of the two ends of the track are different. By an example of FIG. 3, the two ends of the track respectively are the first section 211 and the second section 213. The height of the first section 211 is H1, and the height of the second section is H2. In this embodiment, the rear support member uses a guide wheel, and the front support member uses a driving wheel. The track 210 is wound around the guide wheel and the driving wheel by using the guide wheel and the driving wheel as two ends, respectively. As known to a person skilled in the art, the height of the first section 211 of the track is equivalent to a diameter of the guide wheel or the driving wheel around which the track is wound, and the height of the second section 213 of the track is equivalent to a diameter of the driving wheel or the guide wheel around which the track is wound.

The heights of the two end portions of the track 210 being different is equivalent to the driving wheel and the guide wheel using different sizes of diameters. In this embodiment, the size of the wheel does not affect its function of guiding or driving. Therefore, the guide wheel and the driving wheel in the travel module 20 herein are separately named as a first wheel 202 and a second wheel 204. The robotic lawn-mower 100 has wheels of small diameters, and therefore the gravity center of the overall unit can be reduced. Meanwhile, robotic lawn-mower 100 further has wheels of large diameters, and therefore still has an advantage in obstacle surmounting.

To consider both the climbing performance and obstacle surmounting capability of the track-type robotic lawn-mower 100, a ratio of the diameter of the first wheel 202 to the diameter of the second wheel 204 is in a range of 1:1.5 to 1:5. A specific value of the diameter of the first wheel 202 is in a range of 50 millimeters to 180 millimeters. A specific value of the diameter of the second wheel 204 is in a range of 75 millimeters to 400 millimeters. As known to a person skilled in the art, the first wheel 202 with a small diameter may be used as the driving wheel 203, or the second wheel 204 with a large diameter may be used as the driving wheel 203. The premise of climbing or obstacle surmounting of the overall unit lies in that the front wheel can cross over an obstacle or go uphill, and therefore the obstacle surmounting and climbing capabilities are closely correlated to the front wheel. In this embodiment, by using the second wheel 204 with a large size as the front wheel (relative to a forward direction of the robotic lawn-mower) and using the first wheel 202 with a small size as the rear wheel, the obstacle surmounting and climbing capabilities of the overall unit can be improved significantly.

Factors that affect the height of the gravity center of the overall unit of the robotic lawn-mower 100 mainly are heights of gravity centers of respective large-mass parts and components. The respective large-mass parts and components mainly include an electric motor configured to drive a driving wheel, a gear box configured to adjust a speed of a driving electric motor, an electric motor configured to drive a working module, and an energy storage module configured to storage energies. Therefore, one of methods for controlling the height of the gravity center of the robotic lawn-mower 100 can be achieved by controlling an arrangement and heights of such a type of parts and components.

In a conventional structural design, to control a volume and a mass of the electric motor 102, a high-speed electric motor with a small volume is usually used as the driving electric motor. The electric motor 102 is usually decelerated by the gear box 105 and then drives the driving wheel to rotate at a preset speed. The gear box 105 may be specifically a transmission mechanism capable of changing a speed ratio of a planet gear, and the like. To make it easy to transmit, the electric motor 102, the gear box 105, and the driving wheel are usually arranged coaxially or arranged coaxially and in parallel in the structure. In this embodiment, the first wheel 202 with a small diameter is used as the driving wheel, the heights of the gravity centers of the corresponding electric motor 102 and the gear boxes 105 may correspondingly reduce along with the reduction in the diameter of the driving wheel. The distance from the gravity center of the electric motor 102 to the working surface/ground is in a range of 25 millimeters to 90 millimeters. The distance from the gravity center of the gear box 105 to the working surface/ground is in a range of 25 millimeters to 90 millimeters. By controlling the heights of the gravity centers of the respective elements and components, the height of the gravity center of the overall unit of the robotic lawn-mower 100 is in a range of 25 millimeters to 160 millimeters.

In this embodiment, the electric motor of the driving working module 108 is located at a middle portion of the receiving cavity. Meanwhile, to balance the gravity center of the entire machine body, other components with large masses such as the energy module 106 are mounted in the receiving cavity at positions close to the guide wheel 201.

To ensure that the robotic lawn-mower has climbing and obstacle surmounting capabilities, a higher gravity center of the overall unit is preferred. To enable the robotic lawn-mower to have a good moving performance (including performance such as turning, accelerating, or braking), the gravity center of the overall unit needs to be reduced. In this embodiment, in the vertical direction, the gravity center of the overall unit of the robotic lawn-mower is not higher than the wheel center of the first wheel 202 and the wheel center of the second wheel 204. That is, the gravity center of the overall unit is lower than the wheel center of the larger wheel, to obtain a good obstacle surmounting and climbing performance and moving performance. In other embodiments, to obtain a relatively good moving performance at the same time, the gravity center of the overall unit shall not be lower than the wheel center of the smaller wheel.

In this embodiment, the driving wheel with a small diameter may alternatively be used as the front wheel and is disposed in front of the longitudinal direction, and the guide wheel with a large diameter is used as the rear wheel and is disposed behind the longitudinal direction.

The track-type robotic lawn-mower 100 has a good climbing capability, and if the track 210 can directly be in contact with an object in front, the track may directly run over the object in front regardless of whether the object in front is an obstacle, a human's foot, a tree stump, or the like.

In one of the embodiments, the robotic lawn-mower 100 includes a track resist member 52 located at an end portion of the track 210. Four end portions of the tracks of the track-type robotic lawn-mower are each provided with one track resist member 52. When there is not an obstacle within a close range of the track, the obstacle first collides with the track resist member 52. The robotic lawn-mower 100 further includes a colliding sensor 60, configured to detect whether a colliding accident occurs on the track resist member 52. When the track resist member 52 collides with the obstacle, the colliding sensor 60 senses the colliding accident and transfers the detection result to the control module 104, and the control module 104 controls the robotic lawn-mower 100 to make a turn or retreat, to prevent the track 210 from directly running over the object in front.

As shown in FIG. 2, in this embodiment, the track resist member 52 is disposed on a top cover 50. The top cover 50 is movably connected to a top part of the housing 10. Collision occurs on the track resist member 52 may cause displacement of the top cover 50 relative to the housing 10. The colliding sensor 60 detects that the top cover 50 is displaced relative to the housing 10 and transfers the detection result to the control module 104, and the control module 104 determines that there is an obstacle in front and controls the robotic lawn-mower 100 to make a turn or retreat.

The track resist member 52 has a width and a height and is at a distance from an outer surface of an arc-shaped portion of the track. The four track resist members 52 need to satisfy the same design conditions in aspects of height, width, and gap, and therefore one track resist member 52 is used as an example in the following description.

Figure 5:
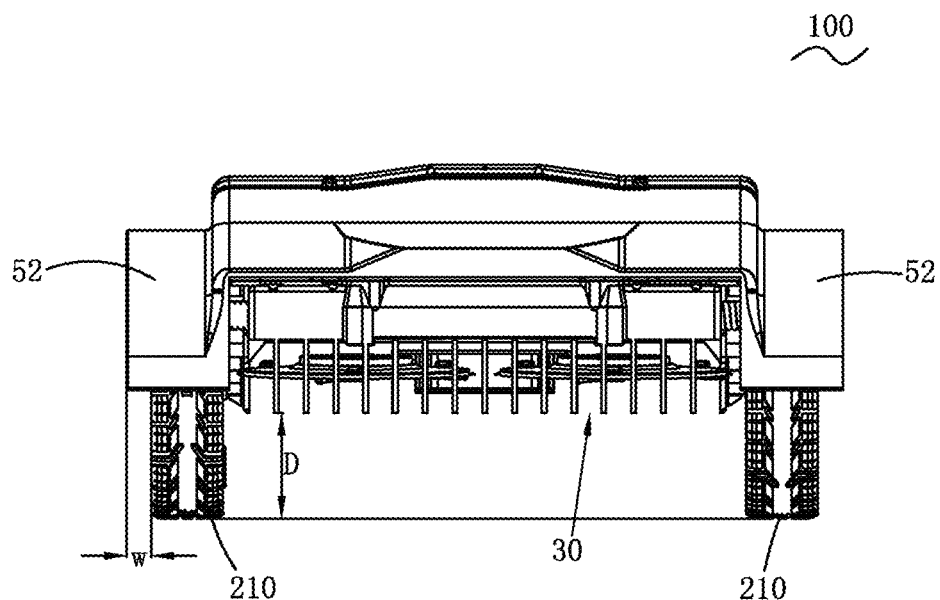
FIG. 5 is a main view of the embodiment shown in FIG. 1.

As shown in FIG. 5, to detect an obstacle in an upper front side of the track, the track resist member 52 needs to cover half or less of a diameter of the arc-shaped portion of the corresponding track in the vertical direction. Specifically, a distance d from a free end of the track resist member 52 in the vertical direction to a working surface/ground is in a range of 40 millimeters to 70 millimeters.

Figure 6:
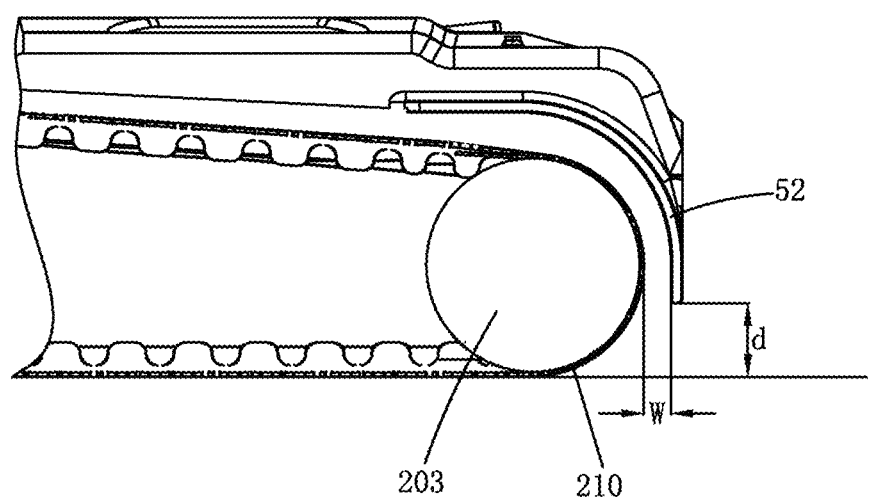
FIG. 6 is a schematic diagram of a left side of the embodiment shown in FIG. 5.

When the distance from the track resist member 52 to an outer surface of the end portion of the track is excessively large, the track resist member 52 first comes in to contact with a slope in the upside when the robotic lawn-mower 100 goes uphill, and the colliding sensor 60 senses a collision accident and transfers the sensing result to the control module 104. The control module 104 determines that an obstacle is in front and therefore controls the robotic lawn-mower 100 to make a turn or retreat, affecting the climbing capability of the overall unit. In order not to affect the climbing capability of the robotic lawn-mower 100, as shown in FIG. 6, a distance W from the track resist member 52 to an inner surface of the end portion of the track needs to be less than or equal to 50 millimeters.

In this embodiment, as shown in FIG. 5, the track resist member 52 is a cover plate of a predetermined shape. In another embodiment, the track resist member 52 may alternatively be a stop lever like a bumper beam. The stop lever includes a shape having a height and a width formed by winding a steel wire member in a predetermined manner. Specifically, the track resist member 52 is a steel wire member, the steel wire member extends toward the track side from the housing 10 or the top cover 50 and winds in front of a end of the track 210 to form a predetermined shape, for example, a paper clip shape, a rectangle shape, or a ring shape. The predetermined shape has a height and a width, to form a stop shield in front of the end of the track 210. When there is an obstacle within a close range of the robotic lawn-mower 100, the obstacle first collides with the track resist member 52.

Certainly, there may be a plurality of specific forms of the track resist member 52, provided that the foregoing parameters are met. The colliding sensor 60 may be specifically a Hall element, a micro switch, a magnetic signal sensor, or the like.

In the prior art, for the wheel-type robotic lawn-mower, to prevent a human's hand or foot from coming into contact with the working module 108 from a front or back side of the robotic lawn-mower, a top cover movable relative to the housing is disposed on the wheel-type robotic lawn-mower. Longitudinal lengths of a front end portion and a rear end portion of the top cover need to be greater than a longitudinal length of the housing, and the top cover may extend downward by a distance in the vertical direction, to construct protecting barriers of the front end and the rear end.

The climbing performance is the advantage of the track-type robotic lawn-mower. If a wheel-type top cover is used for safety protection, the protecting barriers of the front end and the rear end may affect the climbing performance thereof. Therefore, in the track-type robotic lawn-mower, the longitudinal lengths of the front end and the rear end of the top cover slightly exceed the longitudinal length of the housing, or are equal to or less than the longitudinal length of the housing. The top cover of the track-type robotic lawn-mower does not extend downward by a distance to construct the protecting barriers of the front end and the rear end. The distance from the free end of the main body configured to cover the housing to the working surface in the vertical direction is greater than 70 millimeters, so as not to affect the climbing performance of the track-type robotic lawn-mower.

In respect of design and manufacturing of a robotic lawn-mower, the safety problem is a significant factor to be considered. There is a distance from the bottom part of the housing of the robotic lawn-mower to the ground. Through this distance, a human's foot or hand can stretch into the position below the housing and approach a strip blade or the like serving as a cutting element. To satisfy the climbing performance, a top cover structure in the wheel-type robotic lawn-mower cannot be used in the track-type robotic lawn-mower to protect the front and rear ends. Therefore, other structural designs need to be used in the track-type robotic lawn-mower 100, to prevent a human's hand or foot from coming into contact with the working module 108 from the front or back side of the lawn-mower.

As shown in FIG. 1, in this embodiment, a protecting member 30 is disposed at a housing chassis 14. The protecting member 30 is located in front of the working module 108. A protecting barrier is constructed in front of the working module 108, to prevent a human's hand or foot from coming into contact with the working module 108.

One end of the protecting member 30 is connected to the housing chassis 14, and the other end of the protecting member 30 is a free end, configured to form a shield having a predetermined height in the vertical direction. To exert a better protecting function, the distance from the free end of the protecting member 30 to the ground or working surface is in a range of 40 millimeters to 70 millimeters.

Figure 7:
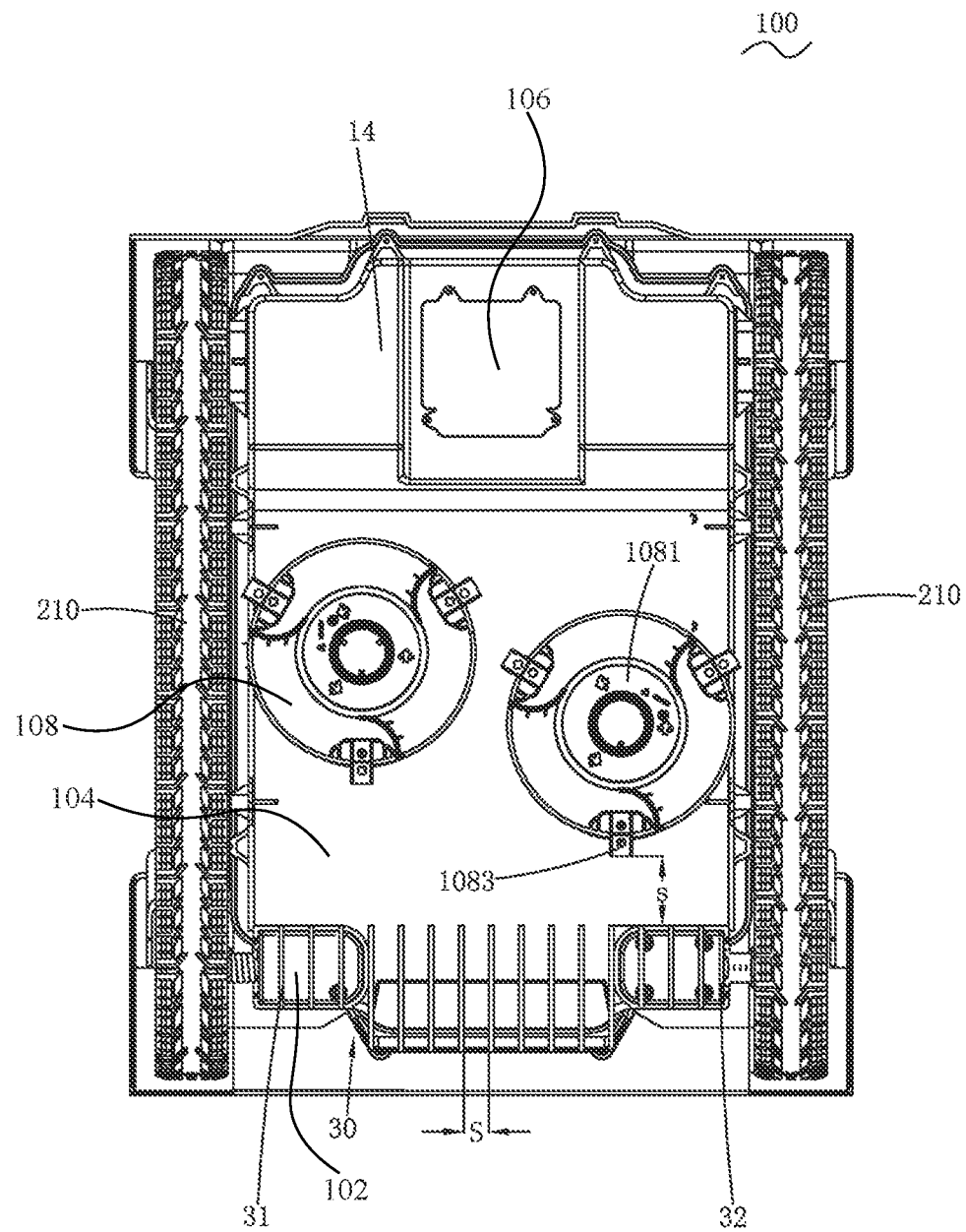
FIG. 7 is a bottom view of the embodiment shown in FIG. 1.

The protecting member 30 is arranged transversely on the housing chassis 14, has a left side 31 and a right side 32, and forms a shield of a predetermined length in the transverse direction. To better exert the protecting function, the transverse length of the protecting member 30 is greater than that of the working module 108. Certainly, if there is a plurality of working modules 108, the transverse length of the protecting member 30 is greater than a total transverse length of the plurality of working modules 108. In one of the embodiments, as shown in FIG. 7, a shortest distance between the left side 31 of the protecting member 30 and a left edge of the housing chassis 14 is less than or equal to 20 millimeters; and a shortest distance between the right side 32 of the protecting member 30 and a right edge of the housing chassis 14 is greater than or equal to 10 millimeters.

As known to a person skilled in the art, the transverse arrangement of the protecting member 30 merely limits the arrangement direction of the protecting member 30 on the bottom part 14 of the housing, but does not limit the arrangement shape of the protecting member 30. As shown in FIG. 7, in this embodiment, the protecting member 30 is transversely arranged in a transverse shape along the bottom part 14 of the housing. Certainly, the protecting member 30 may alternatively be transversely arranged on the bottom part 14 of the housing in other shapes, such as a linear shape, an arc shape, and an irregular shape.

The protecting member 30 is located in front of the working module 108 and forms a distance with the working module 108 in the longitudinal direction, to better prevent a human's hand or foot from coming into contact with the working module 108. A shortest distance from the protecting member 30 to the working module 108 is greater than or equal to 10 millimeters. As shown in FIG. 7, in this embodiment, the shortest distance from the protecting member 30 to the working module 108 is specifically a distance from a end of the cutting element 1083 to a longitudinal rear end of the protecting member 30.

A specific structure of the protecting member 30 may be a plate.

To avoid that the working module 108 cannot touch the grass in front of the protecting member 30 in the running process of the robotic lawn-mower 100 because the protecting member 30 flats or blocks grass, the protecting member 30 is provided with a recess in the vertical direction. In one of the embodiments, as shown in FIG. 1, the entire protecting member 30 presents a comb shape or a fence shape. The protecting member 30 includes a plurality of comb teeth (fences). There are gaps between the respective comb teeth (fences), and grass can pass through or partially pass through the gaps. Therefore, the degree of grass flatting is effectively reduced and the situation in which the working module 108 cannot touch the grass is avoided. The protecting member 30 still requires for a protecting function, and therefore the gap S between adjacent comb teeth cannot be excessively large. In this embodiment, the gap S between adjacent comb teeth is less than or equal to 20 millimeters.

Alternatively, the protecting member 30 may be disposed behind the working module 108. The specific structure and configuration mode are similar to those in the foregoing descriptions and are not described in detail again herein.

In one of the embodiments, a plurality of protecting members 30 may be disposed on the housing chassis 14, and are specifically arranged in front of or behind the working module 108, or are arranged in the periphery of the working module 108 by using the working module 108 as a center. The specific structure and configuration mode are similar to those in the foregoing descriptions and are not described in detail again herein.

Figure 8:
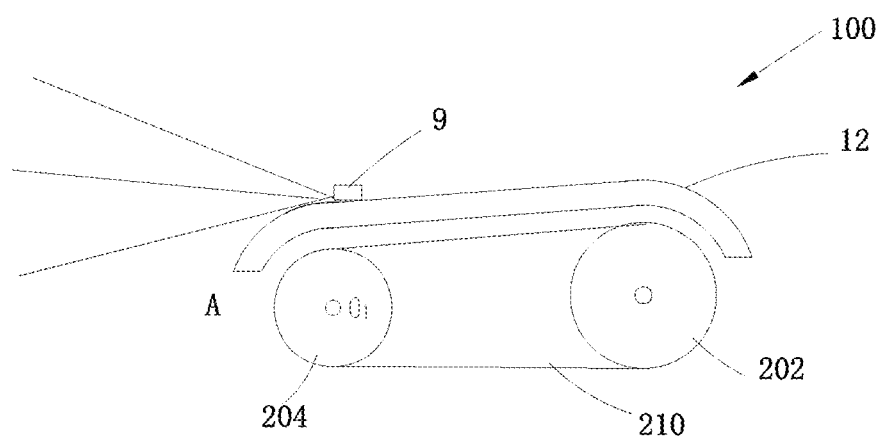
FIG. 8 is a structural diagram of an autonomous lawn-mower according to an embodiment of the present invention.

FIG. 8 is a structural diagram of an autonomous lawn-mower according to another embodiment of the present invention. As shown in FIG. 8, an autonomous lawn-mower 100 includes a housing and a moving module. The moving module includes a track 210, driven by a motor to drive the autonomous lawn-mower 100 to move. In this embodiment, the moving module further includes a front wheel 204 and a rear wheel 202. The track is wound around the front wheel 204 and the rear wheel 202. In other embodiments, the moving module may alternatively not include a front wheel or a rear wheel, provided that a driving mechanism that drives the track to move and a support mechanism that supports the track are provided. In this embodiment, the autonomous lawn-mower includes two sets of tracks 210, respectively disposed on two sides of the autonomous lawn-mower in a moving direction. The autonomous lawn-mower further includes a cutting module (not shown), to perform a grass cutting work. In this embodiment, the cutting module includes a blade. The autonomous lawn-mower further includes a control module, configured to control the autonomous lawn-mower to move and work, and the control module includes a processor and a control circuit. The moving module, the cutting module, and the control module are all mounted on the housing. Certainly, the autonomous lawn-mower further includes an energy module. The energy module includes a battery pack, to provide energies for the autonomous lawn-mower to move and work. The movement of the autonomous lawn-mower in this embodiment mentioned in this embodiment includes a turning motion of the autonomous lawn-mower.

In this embodiment, the robotic lawn-mower includes a first sensor and a second sensor. The first sensor is configured to detect a first area in the moving direction, and the second sensor is configured to detect a second area in the moving direction. Specifically, the first area and the second area are arranged perpendicular to the moving direction. During movement of the robotic lawn-mower, the overall unit is located in a space formed by the first area and the second area together. The first area and the second area are disposed in a longitudinal direction of the robotic lawn-mower 100, and at least partially overlap each other, to avoid the situation in which a vertical detection blind area appears when the robotic lawn-mower is located at a slope (that is, the robotic lawn-mower is inclined). Specifically, an upper boundary of the first area is not lower than 150 millimeters, and a lower boundary of the second area is not higher than 150 millimeters. The first sensor and the second sensor may be two identical contact sensors or non-contact sensors. Certainly, the contact sensor (that is, the colliding sensor 60) and a non-contact sensor may alternatively be selected. In this embodiment, the contact sensor and a non-contact sensor 9 are selected. After the non-contact sensor 9 detects an obstacle, the control module controls the robotic lawn-mower 100 to avoid the obstacle. The robotic lawn-mower 100 may specifically make a turn or retreat. If the contact sensor detects an obstacle, the robotic lawn-mower 100 is already in contact with the obstacle at this time. Therefore, the control module first controls the robotic lawn-mower to retreat, and then to perform a turn action or maintain the retreating action.

As shown in FIG. 8, the non-contact sensor 9 in this embodiment detects whether there is an obstacle in the moving direction of the autonomous lawn-mower. If the non-contact sensor 9 detects an obstacle in the moving direction of the autonomous lawn-mower, the control module adjusts a moving manner of the autonomous lawn-mower. Specifically, if the non-contact sensor 9 detects an obstacle in the moving direction of the autonomous lawn-mower, the control module controls the autonomous lawn-mower to stop moving before colliding with the obstacle. The non-contact sensor 9 is electrically connected to the control module. If the non-contact sensor 9 detects an obstacle in the moving direction of the autonomous lawn-mower, the non-contact sensor 9 sends an electric signal to the control module. The control module processes the electric signal and controls the moving module to adjust the moving manner of the autonomous lawn-mower.

In the autonomous lawn-mower in this embodiment, the tracks 210 are used to drive the autonomous lawn-mower to move, so that the autonomous lawn-mower has a good climbing capability and obstacle surmounting capability. Meanwhile, the autonomous lawn-mower uses the non-contact sensor 9 to detect an obstacle in the moving direction, so that the autonomous lawn-mower detects the obstacle before coming in to contact with the obstacle. Therefore, the moving manner can be adjusted in time, to avoid an impact or damage to the obstacle, in particular, to a human body. The autonomous lawn-mower in this embodiment guarantees the safety while improving the performance. The autonomous lawn-mower in this embodiment has a large mass and is reflected in having a large inertia and having a strong capability in moving on a bumpy ground surface. In this embodiment, the mass of the autonomous lawn-mower is greater than 12 kg. In one of the embodiments, the mass of the autonomous lawn-mower is in a range of 16 to 18 kg. The feature of the autonomous lawn-mower of having a large mass is, on one hand, related to the structural feature of a track-type autonomous lawn-mower. In this embodiment, the autonomous lawn-mower has a large moving speed, is reflected in a strong capability in working against an external force including a gravity force of the autonomous lawn-mower, and can well overcome resistance during movement, for example, resistance during movement on a slope. In this embodiment, a maximum value of the moving speed of the autonomous lawn-mower is greater than 0.45 m/s. In one of the embodiments, the maximum value of the moving speed of the autonomous lawn-mower is in a range of 0.45 to 0.6 m/s. The tracks 210 have strong obstacle surmounting and climbing capabilities, and therefore the autonomous lawn-mower can maintain a large moving speed in the moving process. In this embodiment, a maximum value of a product of mass and speed of the autonomous lawn-mower during movement, that is, a maximum value of a momentum of the autonomous lawn-mower, is greater than 5 kg·m/s. In one of the embodiments, the maximum value of the momentum of the autonomous lawn-mower is in a range of 7.2 kg·m/s to 10.8 kg·m/s. A larger momentum of the autonomous lawn-mower during movement indicates a larger impulse during collision between the autonomous lawn-mower and the obstacle, and for a specific obstacle, indicates a larger impact force during collision. In this embodiment, a maximum value of a collision force when the autonomous lawn-mower collides with a tree is greater than 200 N. In addition, a larger mass and a larger moving speed of the autonomous lawn-mower indicate a larger dynamic energy of the autonomous lawn-mower, and indicate a stronger damage capability generated during collision with the obstacle. Therefore, in the moving process of the autonomous lawn-mower in this embodiment, to avoid direct collision by the autonomous lawn-mower against the obstacle is particularly important, and to detect an obstacle in the moving direction of the autonomous lawn-mower by using the non-contact sensor 9 is particularly worthy and meaningful.

In this embodiment, to enable the autonomous lawn-mower to have good obstacle surmounting performance, a track 210 at the front end of the autonomous lawn-mower is at least partially exposed. Specifically, at the front end in the moving direction of the autonomous lawn-mower, at least a part of the track 210 below the rotation center of the revolving motion of the track 210 is exposed. As shown in FIG. 1, the track 210 of the autonomous lawn-mower is driven by a driving motor to revolve, to drive the autonomous lawn-mower to move. In this embodiment, the track 210 is wound around the front wheel 204 and the rear wheel 202, and is driven by the rear wheel 202 to revolve. At the front end in the moving direction of the autonomous lawn-mower, that is, an end A in FIG. 8, a rotation center of the revolving motion of the track 210 is a rotation center $O_1$ of the front wheel 204, and at least a part of the track 210 below the rotation center $O_1$ of the front wheel 204 is exposed. In other embodiments, the autonomous lawn-mower may not include a front wheel or a rear wheel, and may include other driving or support structures, provided that it is ensured that the part of the track 210 below the rotation enter of the revolving motion of the track 210 at the front end of the autonomous lawn-mower in the moving direction is exposed. In this embodiment, the housing of the autonomous lawn-mower includes an upper cover 12. The upper cover 12 partially covers the track. At the front end of the autonomous lawn-mower, a distance from a lower edge of the upper cover 12 to a working plane is greater than a distance between the rotation center of the revolving motion of the track 210 and the working plane. As shown in FIG. 8, the upper cover 12 of the housing covers a part of the track 210, for example, a portion wound between the front wheel 204 and the rear wheel 202 and does not contact the working surface, to prevent the track 210 from light exposure or rain damage. In this embodiment, to enable the autonomous lawn-mower to cross over a bumped portion on the working surface, for example, an obstacle lay on the working surface, a coverage range of the upper cover 12 is limited. At the front end in the moving direction of the autonomous lawn-mower, the upper cover 12 is not lower than the rotation center $O_1$ of the front wheel 204, so that the part of the track 210 below the rotation center $O_1$ of the front wheel 204 is exposed, and when the autonomous lawn-mower collides with an obstacle during movement, the track 210 can come into contact with the obstacle and cross over the obstacle, rather than stop moving forward due to the shield of the upper cover 12. In other embodiments, the autonomous lawn-mower may not include a front wheel, and the upper cover 12 is enabled not to be lower than the rotation center of the revolving motion of the track 210 at the front end of the autonomous lawn-mower in the moving direction. Specifically, a part of the upper cover 12 that covers the width rang of the track 210 is enabled to satisfy the foregoing conditions. Certainly, at the front end of the autonomous lawn-mower in the moving direction, the track 210 may be enabled to be exposed as much as possible, that is, the distance from the lower edge of the upper cover 12 to the working plane is enabled to be as large as possible. In other embodiments, the upper cover 12 may alternatively not cover the track 210. In this embodiment, at the front end of the autonomous lawn-mower, the part of the track 210 below the rotation center of the revolving motion of the track 210 is exposed, so that the track 210 can come into contact with an obstacle in the moving direction of the autonomous lawn-mower and cross over the obstacle, thereby greatly improving the obstacle surmounting capability of the autonomous lawn-mower. Meanwhile, the track 210 can come into contact with an obstacle in the moving direction of the autonomous lawn-mower and has a capability of crossing over the obstacle. Therefore, when the obstacle in the moving direction of the autonomous lawn-mower is an upright obstacle, such as a human body or a tree, the track 210 may cause a run-over damage to the obstacle if the moving manner of the autonomous lawn-mower is not controlled in time. Further, the autonomous lawn-mower can further move forward after coming into contact with the obstacle, the obstacle may come into contact with the blade below the autonomous lawn-mower, resulting in damage. Therefore, in the moving process of the autonomous lawn-mower in this embodiment, to detect an obstacle in the moving direction of the autonomous lawn-mower by using the non-contact sensor 9 is particularly important. The non-contact sensor 9 can recognize an upright obstacle and enable the autonomous lawn-mower to adjust the moving manner in time. Therefore, the safety is guaranteed while the performance of the autonomous lawn-mower is improved.

In this embodiment, to guarantee that the obstacle in the moving direction of the autonomous lawn-mower is not damaged by the track 210, an effective detection range of the non-contact sensor 9 needs to cover an area exactly in front of the track 210.

Figure 9:
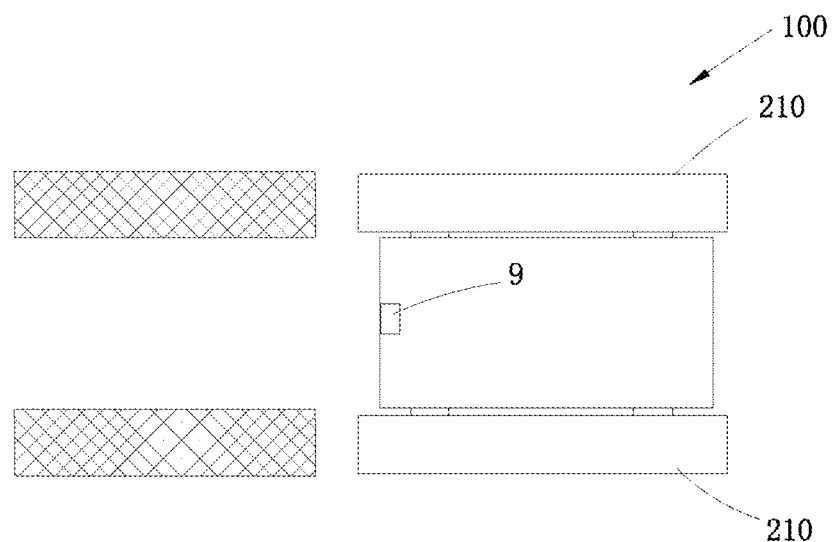
FIG. 9 is a schematic diagram of a detection range of a non-contact sensor according to an embodiment of the present invention.

Specifically, by using a direction that is parallel to a working plane of the autonomous lawn-mower and perpendicular to the moving direction of the autonomous lawn-mower as a width direction, an effective detection width of the non-contact sensor 9 covers a width range of the track 210. As shown in FIG. 9, the effective detection range of the non-contact sensor 9 at least covers the width range in the dashed area. In this embodiment, the effective detection width of the non-contact sensor 9 is greater than a width of the autonomous lawn-mower. That is, the effective detection width of the non-contact sensor 9 covers width ranges of the tracks 210 and a width range between the tracks 210. The non-contact sensor 9 has the foregoing effective detection range, so that the non-contact sensor 9 can detect an obstacle exactly in front of the autonomous lawn-mower during a moving process, to prevent the autonomous lawn-mower from colliding with the obstacle in the moving process, and in particular to prevent the obstacle from run-over damage of the tracks 210, thereby guaranteeing the safety of the autonomous lawn-mower.

Certainly, in the forward direction of the robotic lawn-mower, the non-contact sensor 9 also has a detection blind area, for example, a front area below a baffle (or because the distance is excessively close), a detection signal cannot reach the area due to shielding of the protecting member. Therefore, the colliding sensor and the non-contact sensor can be combined for use, and the detection area of the colliding sensor at least can cover the foregoing blind area, to ensure that all obstacles in the forward direction can be detected, so that the control module can control the robotic lawn-mower to avoid the obstacles in time, thereby avoiding damage caused to a human or an animal and preventing the robotic lawn-mower from damage caused by violent collision. In other embodiments, the colliding sensor may alternatively be a contact sensor in another form.

Figure 10:
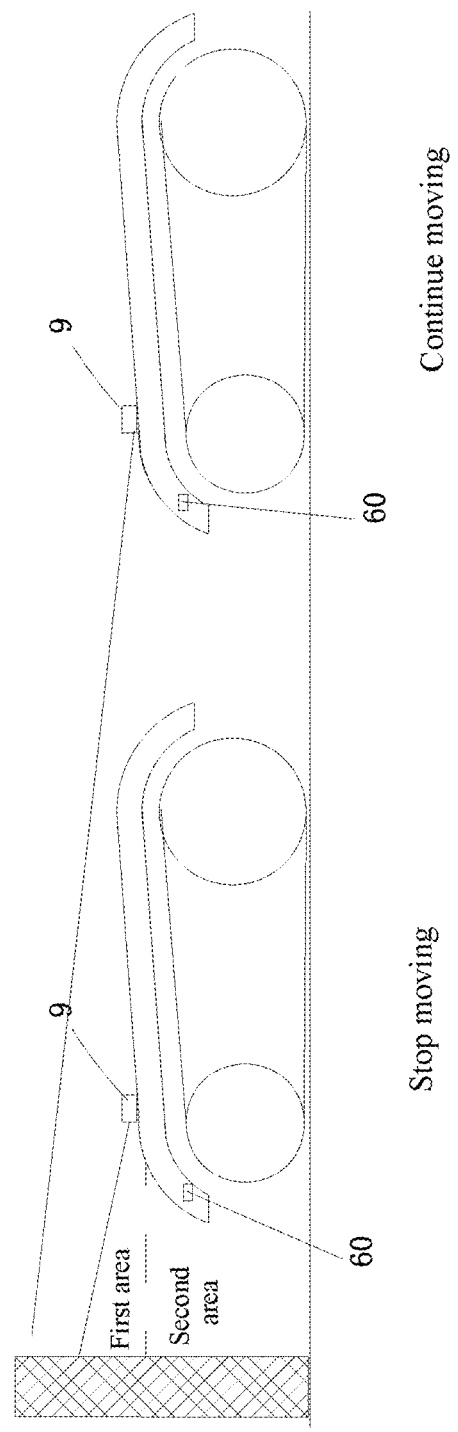
FIG. 10 is a schematic diagram of a moving manner of an autonomous lawn-mower according to an embodiment of the present invention.
Figure 11:
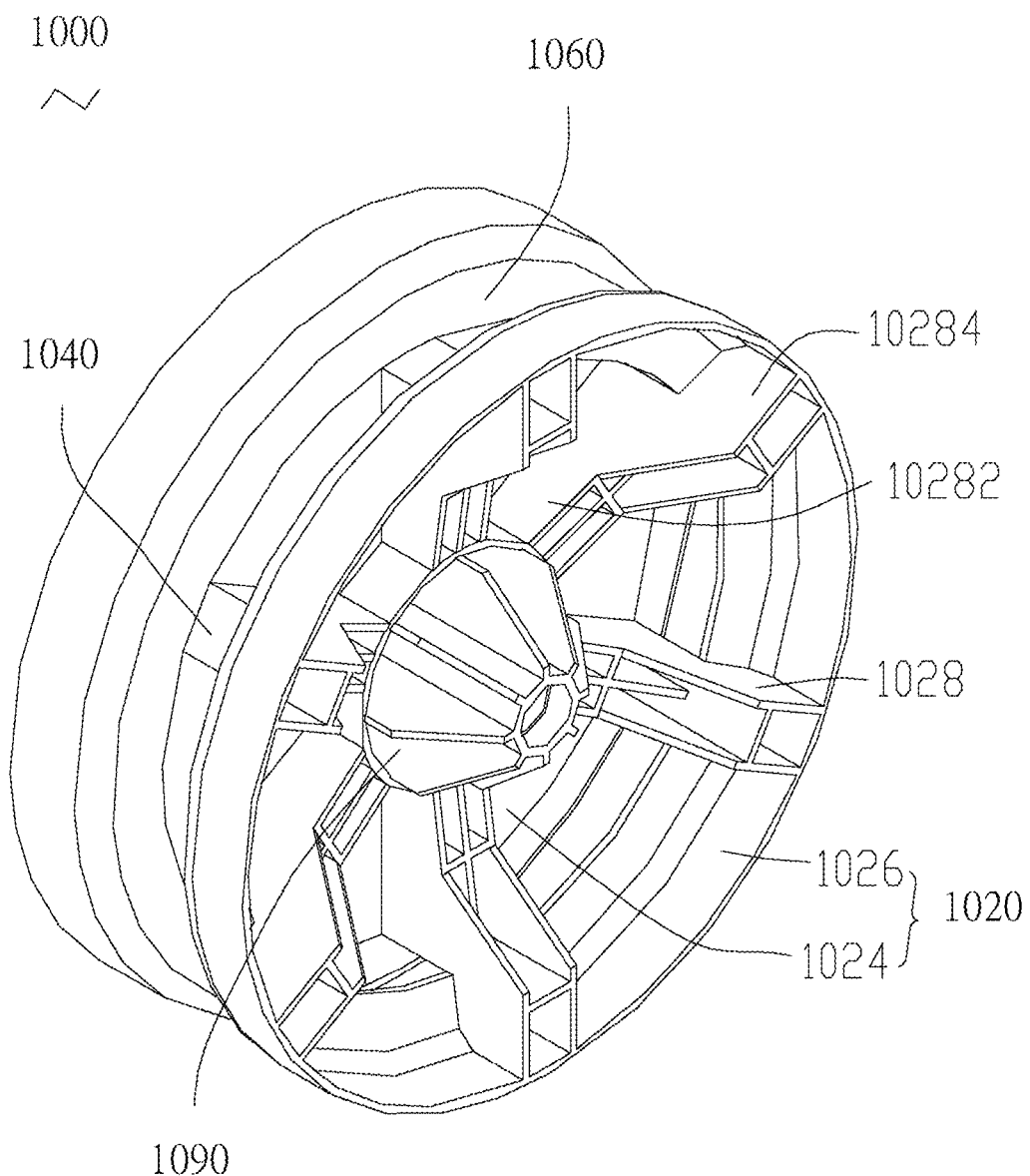
FIG. 11 is a schematic three-dimensional diagram of a track wheel according to an embodiment of the present invention.
Figure 12:
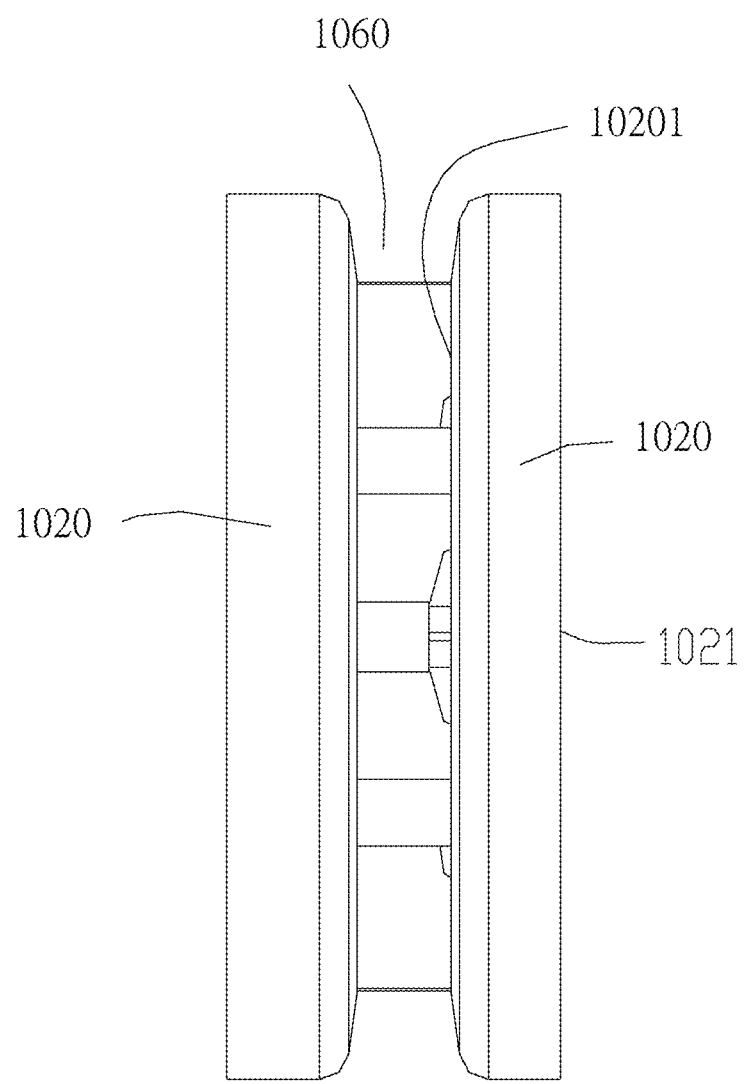
FIG. 12 is a side view of the track wheel shown in FIG. 11.
Figure 13:
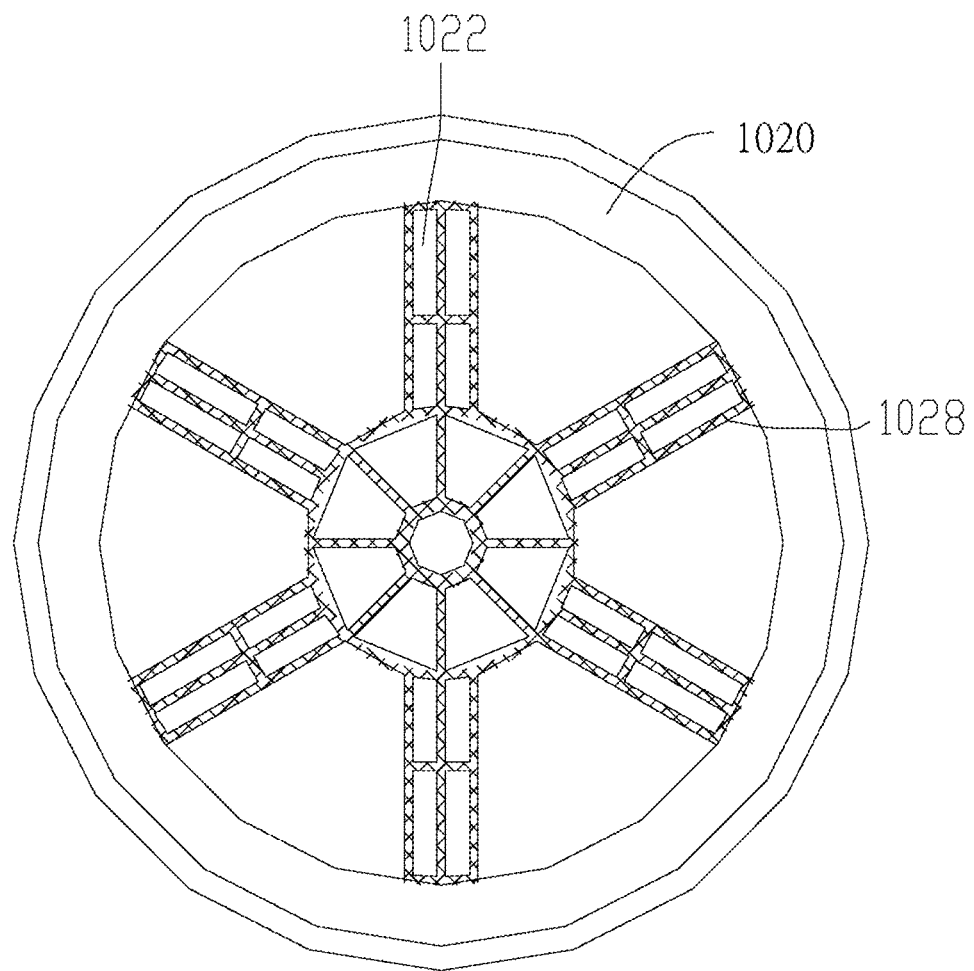
FIG. 13 is a main view of the track wheel shown in FIG. 11.
Figure 14:
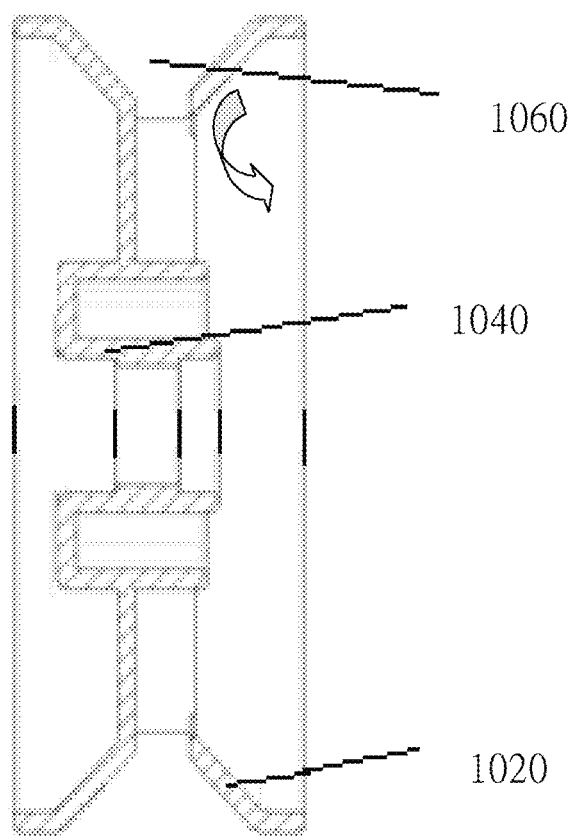
FIG. 14 is a cross-sectional view of the track wheel shown in FIG. 11.

In this embodiment, if the non-contact sensor 9 detects an obstacle in the moving direction of the autonomous lawn-mower, the control module adjusts the moving manner of the autonomous lawn-mower. Specifically, after a distance between the autonomous lawn-mower and the obstacle detected by the non-contact sensor 9 is less than or equal to a predetermined first distance, the control module controls the autonomous lawn-mower to stop moving. As shown in FIG. 10, when detecting an obstacle in the moving direction of the autonomous lawn-mower, the non-contact sensor 9 stops moving after continuously moving for a distance, instead of stopping moving immediately. In this embodiment, the non-contact sensor 9 is an ultrasonic sensor. When there is an obstacle within a second distance in front of the autonomous lawn-mower and the ultrasonic sensor does not detect the obstacle, the area in which the ultrasonic sensor does not detect the obstacle is referred to as a blind area of the ultrasonic sensor. In this embodiment, a distance between the autonomous lawn-mower and the obstacle is less than the second distance when the autonomous lawn-mower stops moving. That is, a brake distance of the autonomous lawn-mower is less than a blind area distance of the ultrasonic sensor. Specifically, in the moving process of the autonomous lawn-mower, the ultrasonic sensor detects an obstacle in the moving direction of the autonomous lawn-mower, the control module controls the autonomous lawn-mower to continuously move, and when the distance between the autonomous lawn-mower and the obstacle reaches the second distance and the ultrasonic sensor does not detect the obstacle, the control module determines that the obstacle enters a blind area of the ultrasonic sensor. The blind area distance is given, the autonomous lawn-mower may be enabled to continuously move for a distance. The moving speed of the autonomous lawn-mower is given, the distance for which the autonomous lawn-mower continuously moves is therefore controlled by controlling a time delay of T, and after the time delay of T, the control module controls the autonomous lawn-mower to stop moving. The control module determines that a first distance for which the autonomous lawn-mower moves before stopping moving may be equal to the second distance, or may be less than the second distance. After the control module determines that the distance between the autonomous lawn-mower and the obstacle reaches the first distance, the autonomous lawn-mower may be directly controlled to brake, or the autonomous lawn-mower may be controlled to brake after the delay time T. Adjustment of the moving manner of the autonomous lawn-mower by the control module ensures the safety of the autonomous lawn-mower, and meanwhile enables the autonomous lawn-mower to move to a position as near to the obstacle as possible. In this embodiment, after the non-contact sensor 9 detects the obstacle, the control module enables the autonomous lawn-mower to continuously move at the original travelling speed and to stop moving before colliding with the obstacle.

In other embodiments, after the non-contact sensor 9 detects the obstacle, the control module may alternatively control the autonomous lawn-mower to reduce the travelling speed, control the autonomous lawn-mower to make a turn, or control the autonomous lawn-mower to retreat, or may selectively combine the respective travel policies, and details are not described herein.

In this embodiment, at least one of the non-contact sensors 9 is disposed in front of the autonomous lawn-mower in the moving direction, so as to detect an obstacle in the moving direction of the autonomous lawn-mower. Certainly, the non-contact sensors 9 may alternatively be disposed at a plurality of orientations of the autonomous lawn-mower, to detect obstacles at a plurality of angles and to assist the respective travel policies of the autonomous lawn-mower. The non-contact sensor 9 may alternatively be disposed to have an adjustable detection angle, to flexibly adapt to the movement and work of the autonomous lawn-mower.

In this embodiment, the non-contact sensor 9 is an ultrasonic sensor. The ultrasonic sensor has a strong anti-interference capability and stable performance. In other embodiments, the non-contact sensor 9 may alternatively be an optical sensor, for example, an infrared vision or camera, provided that the non-contact sensor 9 can detect the obstacle before the autonomous lawn-mower collides with the obstacle.

Another embodiment further provides a track wheel 1000, that is, the foregoing driving wheel or guide wheel. Referring to FIG. 11 to FIG. 14, in an embodiment of the present invention, the track wheel 1000 includes two flanges 1020 and a connection portion 1040 that connects the two flanges 1020 and that is located between the flanges 1020. The flange 1020 includes a first side 10201 and a second side 1021 opposite to each other, the first sides 10201 of the two flanges 1020 are disposed close and opposite to each other, an engagement slot 1060 is disposed between the two flanges 1020, and at least one of the flanges 1020 is provided with a through hole 1022 communicated to the engagement slot 1060 and the second sides 1021, so that an object in the engagement slot 1060 can pass through the through hole 1022. In this embodiment, the two flanges 1020 are each provided with a through hole 1022. That is, at least one of the flanges 1020 of the track wheel 1000 is provided with a discharge channel communicated to an engagement portion between the track and the flange 1020 and connected to an outside of the track wheel 1000, so as to discharge mud or grass carried at the engagement portion between the track and the flange 1020 to the outside of the track wheel 1000.

During use, the track is engaged with the flange 1020 to be wound around the track wheel 1020. When mud or grass enters an engagement portion between the track and the track wheel 1000, the mud or grass may enter the engagement slot 1060 and be discharged, via the through hole 1022, to the second sides 1021 of the flanges 1020, thereby preventing the track wheel 1000 from carrying mud or grass and ensuring continuous and normal operation of the track wheel 1000.

In this embodiment, the flange 1020 includes a bottom plate 1024 and a rim 1026 disposed at an edge of the bottom plate 1024, the through hole 1022 is provided on the bottom plate 1024, and the track is engaged with the rim 1026 of the flange 1020.

In this embodiment, a bottom plate 1024 of the flange 1020 is provided with a reinforcing frame 1028. The reinforcing frame 1028 includes a hollow cavity. The through hole 1022 is communicated to the hollow cavity. Specifically, the flange 1020 is provided with a plurality of reinforcing frames 1028 arranged at intervals. By disposing the reinforcing frames 1028, the strength of the flange 1020 can be increased. Configuration of the hollow cavity not only can reduce the weight of the flange 1020, but also can be communicated to the through hole 1022 to discharge mud or grass out of the track wheel 1000. It can be understood that the through hole 1022 may alternatively not be communicated to the hollow cavity of the reinforcing frame 1028, but be directly communicated to the second sides 1021 of the flange 1020. However, by communicating the through hole 1022 to the hollow cavity of the reinforcing frame 1028 and performing discharging at the reinforcing frame 1028, mud or grass can be discharged further out of the track wheel 1000, making it more convenient to discharge mud or grass.

In this embodiment, the reinforcing frame 1028 is in a stair-like shape and includes a root 10282 close to a center of the bottom plate 1024 and a top part 10284 away from the center of the bottom plate 1024 and connected to the rim 1026. Specifically, the top part 10284 is disposed slantingly and a side of the top part 10284 away from the root 10282 inclines to the side of the rim 1026. Correspondingly, the hollow cavity of the reinforcing frame 1028 also inclines toward the top part 10284.

In this embodiment, the track wheel 1000 further includes a hub 1090 disposed at the center of the flange 1020. A center of the hub 1090 is provided with a connecting hole, for mounting the track wheel 1000 to a bracket of the track travel mechanism.

The embodiments of the present invention further provide a track travel mechanism, including a track and the track wheel 1000. The track wheel 1000 includes a driving wheel and a guide wheel. The track covers the driving wheel and the guide wheel.

The embodiments of the present invention further provide a track-type robotic lawn-mower, including the track travel mechanism and a working component mounted on the machine body of the track travel mechanism and configured to cut grass, and the working component is mounted on the machine body.

It can be conceived of by a person skilled in the art that the present invention may alternatively have other implementations, for example, the specific structural design does not use the track-type robotic lawn-mower as a carrier, but uses another type of track-type service self-moving device as a carrier, such as a self-moving device for cleaning, a self-moving device for shipping, or a self-moving device for snow sweeping. The implementations whose technical essence used is the same as or similar to that of the present invention, or any changes and replacements made based on the present invention shall all fall within the protection scope of the present invention.

The invention claimed is:

1. A self-moving device, comprising:
   a housing, provided with a motor;
   a top cover having a main body configured to cover the housing, wherein the main body includes a lowermost free end;
   a protecting member connected to the housing and positioned below the lowermost free end of the main body;
   a moving module, comprising a track, the track, driven by the motor, moving the self-moving device;
   a working module;
   a control module controlling movement of the moving module and working of the working module;
   a first sensor and a second sensor, configured to detect an obstacle in a moving direction of the self-moving device, wherein the first sensor is configured to detect a first area in the moving direction, the second sensor is configured to detect a second area in the moving direction, and the first area and the second area are arranged perpendicular to the moving direction of the self-moving device as a vertical direction;

the control module controls a moving manner of the self-moving device according to sensing results of the first sensor and the second sensor;

the first sensor is a non-contact sensor and the second sensor is a contact sensor; and wherein by using a direction that is parallel to a working plane of the self-moving device and perpendicular to the moving direction of the self-moving device as a width direction, an effective detection width of the non-contact sensor covers a width range of the track; and a track resist member configured to protect the track, and wherein the second sensor is disposed on the track resist member, wherein the track resist member includes a lowermost free end, and wherein a first distance from the lowermost free end of the track resist member in the vertical direction to a working surface is less than a second distance from the lowermost free end of the main body in the vertical direction to the working surface.

2. The self-moving device according to claim 1, wherein the first area and the second area are provided in a height direction of the self-moving device.

3. The self-moving device according to claim 2, wherein the first area and the second area at least partially overlap each other.

4. The self-moving device according to claim 2, wherein an upper boundary of the first area is not lower than 150 millimeters, and a lower boundary of the second area is not higher than 150 millimeters.

5. The self-moving device according to claim 1, wherein after the first sensor and/or the second sensor detects the obstacle, the control module controls the self-moving device to avoid the obstacle.

6. The self-moving device according to claim 1, wherein the first distance from the lowermost free end of the track resist member to the working surface in the vertical direction is in a range of 40 millimeters to 70 millimeters or the lowermost free end of the track resist member in the vertical direction is lower than half of a height of a end of the track in the vertical direction.

7. The self-moving device according to claim 1, wherein a shortest distance from the track resist member to the track under the track resist member is less than or equal to 50 millimeters.

8. The self-moving device according to claim 1, wherein the contact sensor comprises a Hall sensor, a magnetic signal induction sensor, or a micro switch.

9. The self-moving device according to claim 1, wherein a maximum value of a momentum of the self-moving device during movement is greater than 5 kg·m/s.

10. The self-moving device according to claim 1, wherein a mass of the self-moving device is greater than 12 kg.

11. The self-moving device according to claim 1, wherein a maximum value of a moving speed of the self-moving device is greater than 0.45 m/s.

12. The self-moving device according to claim 1, wherein at least a part of the track that is below a rotation center of revolving motion of the track is exposed at a front end of the self-moving device in the moving direction.

13. The self-moving device according to claim 1, wherein after a distance between the self-moving device and the obstacle detected by the non-contact sensor is less than or equal to a predetermined first distance, the control module controls the self-moving device to stop moving.

14. The self-moving device according to claim 13, wherein after the distance between the self-moving device and the obstacle detected by the non-contact sensor is less than or equal to the first distance, the control module controls the self-moving device to stop moving after a time delay of T.

15. The self-moving device according to claim 13, wherein the non-contact sensor is an ultrasonic sensor, and if there is an obstacle within a second distance in front of the self-moving device, the ultrasonic sensor does not detect the obstacle, the first distance is less than or equal to the second distance.

16. The self-moving device according to claim 1, wherein if the non-contact sensor detects an obstacle in front of the self-moving device, the control module optionally controls the self-moving device to decelerate, make a turn, or retreat.

17. The self-moving device according to claim 1, wherein the non-contact sensor is an ultrasonic sensor or an optical sensor.

18. A control method for a self-moving device, the self-moving device comprising a moving module, the moving module comprising a track, and the track being driven by a motor to drive the self-moving device to move, wherein the control method for the self-moving device comprises the steps of:

detecting, by a first sensor and a second sensor, whether there is an obstacle in a moving direction of the self-moving device;

using the first sensor to detect a first area in the moving direction and using the second sensor to detect a second area in the moving direction, the first area and the second area being arranged perpendicular to the moving direction of the self-moving device as a vertical direction;

controlling, by a control module, a moving manner of the self-moving device according to sensing results of the first sensor and the second sensor;

the first sensor is a non-contact sensor and the second sensor is a contact sensor; and wherein by using a direction that is parallel to a working plane of the self-moving device and perpendicular to the moving direction of the self-moving device as a width direction, an effective detection width of the non-contact sensor covers a width range of the track;

protecting the track with a track resist member, wherein the second sensor is disposed on the track resist member, and wherein a lowermost free end of the track resist member is closer to a working surface in the vertical direction than a lowermost free end of a top cover main body; and protecting a working module from coming in contact with the user using a protecting member positioned in front of the working module in the moving direction.

* * * * *